US010469752B2

(12) United States Patent
Maede et al.

(10) Patent No.: US 10,469,752 B2
(45) Date of Patent: Nov. 5, 2019

(54) IMAGING DEVICE THAT ADJUSTS LENS POSITIONING BASED ON A RATIO IN ORDER TO ADDRESS CROSSTALK

(71) Applicant: ROHM CO., LTD., Ukyo-ku Kyoto (JP)

(72) Inventors: Jun Maede, Kyoto Japan (JP); Akihito Saito, Ukyo-ku Kyoto (JP); Hiromichi Tanimukai, Ukyo-ku Kyoto (JP); Yoshihiro Sekimoto, Ukyo-ku Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 15/989,821

(22) Filed: May 25, 2018

(65) Prior Publication Data

US 2018/0343393 A1 Nov. 29, 2018

(51) Int. Cl.
*H04N 5/232* (2006.01)
*G03B 5/04* (2006.01)
*G03B 5/02* (2006.01)

(52) U.S. Cl.
CPC .......... *H04N 5/23287* (2013.01); *G03B 5/02* (2013.01); *G03B 5/04* (2013.01); *H04N 5/23254* (2013.01);
(Continued)

(58) Field of Classification Search
CPC ........ H04N 5/23287; G03B 2205/0053; G03B 2205/0015
See application file for complete search history.

(56) References Cited

U.S. PATENT DOCUMENTS

| 5,842,053 A * | 11/1998 | Ueyama | G02B 27/646 396/55 |
|---|---|---|---|
| 10,216,000 B2 * | 2/2019 | Park | G02B 27/646 |

(Continued)

FOREIGN PATENT DOCUMENTS

| JP | 2012037865 A | 2/2012 |
|---|---|---|
| JP | 6005370 A | 9/2016 |

*Primary Examiner* — Gary C Vieaux
(74) *Attorney, Agent, or Firm* — Cantor Colburn LLP

(57) ABSTRACT

An imaging device includes: imaging lens displaceable in first and second directions in plane perpendicular to optical axis; actuator positioning the imaging lens in the first and second directions; position detector generating first and second position detection signals $H_x$ and $H_y$, $H_x$ including crosstalk component caused by displacing the imaging lens in the second direction, and $H_y$ including crosstalk component caused by displacing the imaging lens in the first direction; crosstalk compensator correcting $H_x$ and $H_y$ to reduce crosstalk components included in $H_x$ and $H_y$; and driver controlling the actuator based on corrected first and second position detection signals $H_x'$ and $H_y'$, wherein when ratio of $H_y$ to $H_x$ while driving the imaging lens in the first direction is α and ratio of $H_x$ to $H_y$ while driving the imaging lens in the second direction is β, the crosstalk compensator reduces crosstalk components included in $H_x$ and $H_y$.

13 Claims, 15 Drawing Sheets

(52) U.S. Cl.
CPC . *H04N 5/23258* (2013.01); *G03B 2205/0015* (2013.01); *G03B 2205/0053* (2013.01); *G03B 2217/005* (2013.01)

(56) References Cited

U.S. PATENT DOCUMENTS

2012/0014681 A1\* 1/2012 Miyahara ............. G02B 27/646
396/55
2017/0134718 A1\* 5/2017 Goulanian ............. G03B 35/18

\* cited by examiner

IMAGING DEVICE THAT ADJUSTS LENS POSITIONING BASED ON A RATIO IN ORDER TO ADDRESS CROSSTALK

CROSS-REFERENCE TO RELATED APPLICATION

The present application claims priority under 35 U.S.C. § 119 to Japanese Patent Application Nos. 2017-105643, filed on May 29, 2017, and 2017-121347, filed on Jun. 21, 2017, the entire contents of which are incorporated herein by reference.

TECHNICAL FIELD

The present disclosure relates to an imaging device.

BACKGROUND

Recently, a camera module mounted on a smartphone or the like increasingly incorporates a function of detecting a position (displacement amount) of an imaging lens and feeding back the position information to control the position of the imaging lens with high precision and at a high speed. In particular, since high-precision camera shake correction is possible by introducing feedback control as optical image stabilization (OIS), the cameras that adopt OIS, along with the growing demand for capturing, without shaking, distant subjects in dark places, will continue to increase in the future.

In a camera having the OIS function that introduces such feedback control, shake around a pitch axis (referred to as "shake in a pitch direction") and shake around a yaw axis (referred to as "shake in a yaw direction") are detected by a gyro sensor, and the camera shake is corrected by shifting the lens in an XY plane perpendicular to an optical axis according to an angle shake amount which is calculated. This camera shake correction processing is referred to as a "lens shift method" or a "barrel shift method". At this time, it is necessary to shift the lens in an X axis direction with respect to the camera shake (arc movement) in the yaw direction, and to shift the lens in a Y axis direction with respect to the camera shake (arc movement) in the pitch direction.

In order to perform the feedback control, it is necessary to detect positions (displacement amounts) of the lens in the X axis direction and the Y axis direction. To this end, it is necessary to accurately detect a displacement in the X axis direction by an X axis position sensor (displacement sensor), and to accurately detect a displacement in the Y axis direction by an Y axis position sensor.

However, a so-called crosstalk may occur in which although the displacement in the X axis direction is given, the Y axis position sensor detects the displacement, or conversely although the displacement in the Y axis direction is given, the X axis position sensor detects the displacement. When such crosstalk occurs, correct position detection cannot be performed, which causes a control error of camera shake correction. Thus, there is a possibility that the camera shake suppressing performance is deteriorated. In the related art, a technique related to the correction of crosstalk (axial interference) has been disclosed.

SUMMARY

The present disclosure provides some embodiments of an imaging device capable of correcting a crosstalk with higher precision.

According to an embodiment of the present disclosure, there is provided an imaging device. The imaging device includes: an imaging lens supported so as to be displaceable in a first direction and a second direction in a plane perpendicular to an optical axis; an imaging element configured to capture an image that has passed through the imaging lens; an actuator configured to position the imaging lens in the first direction and the second direction; a position detector configured to generate a first position detection signal indicating a position of the imaging lens in the first direction and to generate a second position detection signal indicating a position of the imaging lens in the second direction, the first position detection signal including a crosstalk component caused by displacing the imaging lens in the second direction, and the second position detection signal including a crosstalk component caused by displacing the imaging lens in the first direction; a crosstalk compensator configured to correct the first position detection signal and the second position detection signal such that the crosstalk components respectively included in the first position detection signal and the second position detection signal are reduced; and a driver configured to control the actuator based on a corrected first position detection signal and a corrected second position detection signal. When a ratio of the second position detection signal $H_y$ to the first position detection signal $H_x$ while driving the imaging lens in the first direction is set to $\alpha$ and a ratio of the first position detection signal $H_x$ to the second position detection signal $H_y$ while driving the imaging lens in the second direction is set to $\beta$, the crosstalk compensator is configured to reduce the crosstalk components included in the first position detection signal $H_x$ and the second position detection signal $H_y$ according to the following equations:

$$H_x' = H_x - \beta \cdot H_y$$

$$H_y' = H_y - \alpha \cdot H_x.$$

According to the embodiment of the present disclosure, it is unnecessary to measure a deviation angle between a drive axis and a detection axis, and crosstalk can be corrected irrespective of a difference between a sensitivity of a first position detector and a sensitivity of a second position detector. Thus, data necessary for correction to be acquired in a calibration process can be minimized.

In some embodiments, when a detection sensitivity in the first direction and a detection sensitivity in the second direction measured before assembling the actuator in the imaging device are respectively set to $S_x$ and $S_y$ and a detection sensitivity in the first direction and a detection sensitivity in the second direction measured after assembling the actuator in the imaging device are respectively set to $S_x'$ and $S_y'$, the crosstalk compensator may reduce the crosstalk components included in the first position detection signal $H_x$ and the second position detection signal $H_y$ according to the following equations:

$$H_x' = H_x - S_x'/S_y' \cdot S_y/S_x \cdot \beta H_y$$

$$H_y' = H_y - S_y'/S_x' \cdot S_x/S_y \cdot \alpha H_x.$$

Thus, it is possible to further reduce the crosstalk components when an amplifier gain or the like of the position detector is different before assembly and after assembly.

According to another embodiment of the present disclosure, there is provided an imaging device. The imaging device includes: an imaging lens supported so as to be displaceable in a first direction and a second direction in a plane perpendicular to an optical axis; an actuator configured to position the imaging lens in the first direction and the second direction; a position detector configured to generate a first position detection signal $H_x$ indicating a position of the imaging lens in the first direction and to generate a second position detection signal $H_y$ indicating a position of the imaging lens in the second direction, the first position detection signal $H_x$ including a crosstalk component caused by displacing the imaging lens in the second direction, and the second position detection signal $H_y$ including a crosstalk component caused by displacing the imaging lens in the first direction; a crosstalk compensator configured to correct the first position detection signal $H_x$ and the second position detection signal $H_y$ such that the crosstalk components respectively included in the first position detection signal $H_x$ and the second position detection signal $H_y$ are reduced; and a driver configured to control the actuator based on a crosstalk-corrected first position detection signal $H_x'$ and a crosstalk-corrected second position detection signal $H_y'$. When a displacement amount X indicated by the first position detection signal $H_x$ and a displacement amount Y indicated by the second position detection signal $H_y$ are plotted while driving and displacing the imaging lens in the first direction, the following equation is established, $$Y = C_x \cdot X,$$

when a displacement amount X indicated by the first position detection signal $H_x$ and a displacement amount Y indicated by the second position detection signal $H_y$ are plotted while driving and displacing the imaging lens in the second direction, the following equation is established, $$X = C_y \cdot Y, \text{ and}$$

when a detection sensitivity in the first direction is set to $S_x$ and a detection sensitivity in the second direction is set to $S_y$, measured before assembling the actuator in the imaging device, and a detection sensitivity in the first direction is set to $S_x'$ and a detection sensitivity in the second direction is set to $S_y'$, measured after assembling the actuator in the imaging device, the crosstalk compensator is configured to reduce the crosstalk components included in the first position detection signal $H_x$ and the second position detection signal $H_y$ according to the following equations:

$$H_x - S_x'/S_y' \cdot C_y \cdot H_y$$

$$H_y - S_y'/S_x' \cdot C_x \cdot H_x.$$

In some embodiments, correct displacement information of the imaging lens used in a calibration process may be calculated as a moving distance of an image when the imaging lens moves, based on image information of the imaging element.

Thus, it is possible to obtain displacement information in the first direction and the second direction of the imaging lens without using an expensive displacement measurer.

In some embodiments, the moving distance of the image may be calculated based on the number of pixels to which the image has moved and a pixel pitch of the imaging element. Thus, the displacement of the imaging lens may be calculated by simple calculation.

In some embodiments, the imaging device may further include a linear compensator configured to correct linearity of a relationship between displacement of the imaging lens in the first direction and the first position detection signal and to correct linearity of a relationship between the displacement of the imaging lens in the second direction and the second position detection signal.

Thus, since the linearity of the relationship between the position detection signal and the displacement of the imaging lens before the crosstalk compensation can be corrected, it is possible to improve the precision of crosstalk compensation.

In some embodiments, the imaging device may further include a temperature compensator configured to correct temperature dependence of the relationship, in addition to the linear compensator.

By performing temperature compensation in addition to the linear compensation, it is possible to further improve the precision of crosstalk compensation.

In some embodiments, temperature detection of the temperature compensator uses temperature characteristics of an internal resistance of the position detector.

Since the temperature is detected by using a change in resistance between the terminals of the position detector, it is possible to accurately recognize an ambient temperature of an object to be temperature-compensated, and to realize high-precision temperature compensation.

According to another embodiment of the present disclosure, there is provided an imaging device. The imaging device includes: an imaging lens supported so as to be displaceable in a first direction and a second direction in a plane perpendicular to an optical axis; an imaging element configured to capture an image that has passed through the imaging lens; an actuator configured to position the imaging lens in the first direction and the second direction; a position detector configured to generate a first position detection signal $H_x$ indicating a position of the imaging lens in the first direction and to generate a second position detection signal $H_y$ indicating a position of the imaging lens in the second direction; a crosstalk compensator configured to correct the first position detection signal $H_x$ and the second position detection signal $H_y$ such that crosstalk components respectively included in the first position detection signal $H_x$ and the second position detection signal $H_y$ are reduced; and a driver configured to control the actuator based on a crosstalk-corrected first position detection signal $H_x'$ and a crosstalk-corrected second position detection signal $H_y'$, wherein the first position detection signal $H_x$ includes a crosstalk component caused by displacing the imaging lens in the second direction and the second position detection signal $H_y$ includes a crosstalk component caused by displacing the imaging lens in the first direction, wherein correct displacement information of the imaging lens is calculated as a moving distance of the image when the imaging lens moves, based on image information of the imaging element, wherein when a movement amount $a_x$ of the image in the first direction and a movement amount $a_y$ of the image in the second direction are plotted by controlling the actuator so as not to cause a change in the second position detection signal, the following equation is established:

$$a_y = C_x \cdot a_x,$$

wherein when a movement amount $b_x$ of the image in the first direction and a movement amount $b_y$ of the image in the second direction are plotted by controlling the actuator so as not to cause a change in the first position detection signal, the following equation is established:

$$b_x = C_y \cdot b_y, \text{ and}$$

wherein when detection sensitivities in the first direction and the second direction are respectively set to $S_x$ and $S_y$, the crosstalk compensator is configured to reduce the crosstalk components included in the first position detection signal $H_x$ and the second position detection signal $H_y$ according to the following equations:

$$H_x'=H_x-S_x/S_y \cdot C_y \cdot H_y$$

$$H_y'=H_y-S_y/S_x \cdot C_x \cdot H_x.$$

Accordingly, it is possible to obtain correct displacement information in the first direction and the second direction of the imaging lens without using an expensive displacement measurer. In addition, it is possible to acquire data necessary for crosstalk compensation by using the output of the imaging element. Furthermore, it is possible to compensate for crosstalk caused by deviation of the pixel axis.

In some embodiments, the actuator may be controlled so as not to cause a change in the second position detection signal such that closed-loop control is performed by feeding back the first position detection signal and the second position detection signal, the actuator may be controlled so as not to cause a change in the first position detection signal while giving an offset to the first position detection signal in order to move the image in the first direction, and an offset may be given to the second position detection signal in order to move the image in the first direction.

By giving an offset to the Hall signal while performing closed-loop control to displace the lens in this manner, it is unnecessary to perform a search for finding a drive direction in which a crosstalk does not occur and it is possible to easily measure inclination of the Hall detection axis and the pixel axis.

In some embodiments, the imaging device may further include a linear compensator configured to correct linearity of a relationship between displacement of the imaging lens in the first direction and the first position detection signal $H_x$ and linearity of a relationship between displacement of the imaging lens in the second direction and the second position detection signal $H_y$. The crosstalk compensator may correct a linear-compensated first position detection signal $H_x''$ and a linear-compensated second position detection signal $H_y''$ such that crosstalk components included in the linear-compensated first position detection signal $H_x''$ and the linear-compensated second position detection signal $H_y''$ are reduced.

Thus, it is possible to obtain displacement information in the first direction and the second direction of the imaging lens necessary for linear compensation without using an expensive displacement measurer, and to also improve the precision of crosstalk compensation by the linear compensation.

In some embodiments, the imaging device may further include a temperature compensator configured to correct temperature dependence of the relationship, in addition to the linear compensation part. Temperature detection of the temperature compensator may use temperature characteristics of an internal resistance of the position detector.

In addition, any combination of the foregoing components or any replacement of the components or representations of the present disclosure among methods, devices, systems, and the like may also be effective as embodiments of the present disclosure.

Further, description of means to solve problems does not explain all the essential features and therefore subcombinations of features which are described may also be the invention.

DETAILED DESCRIPTION

Figure 1:
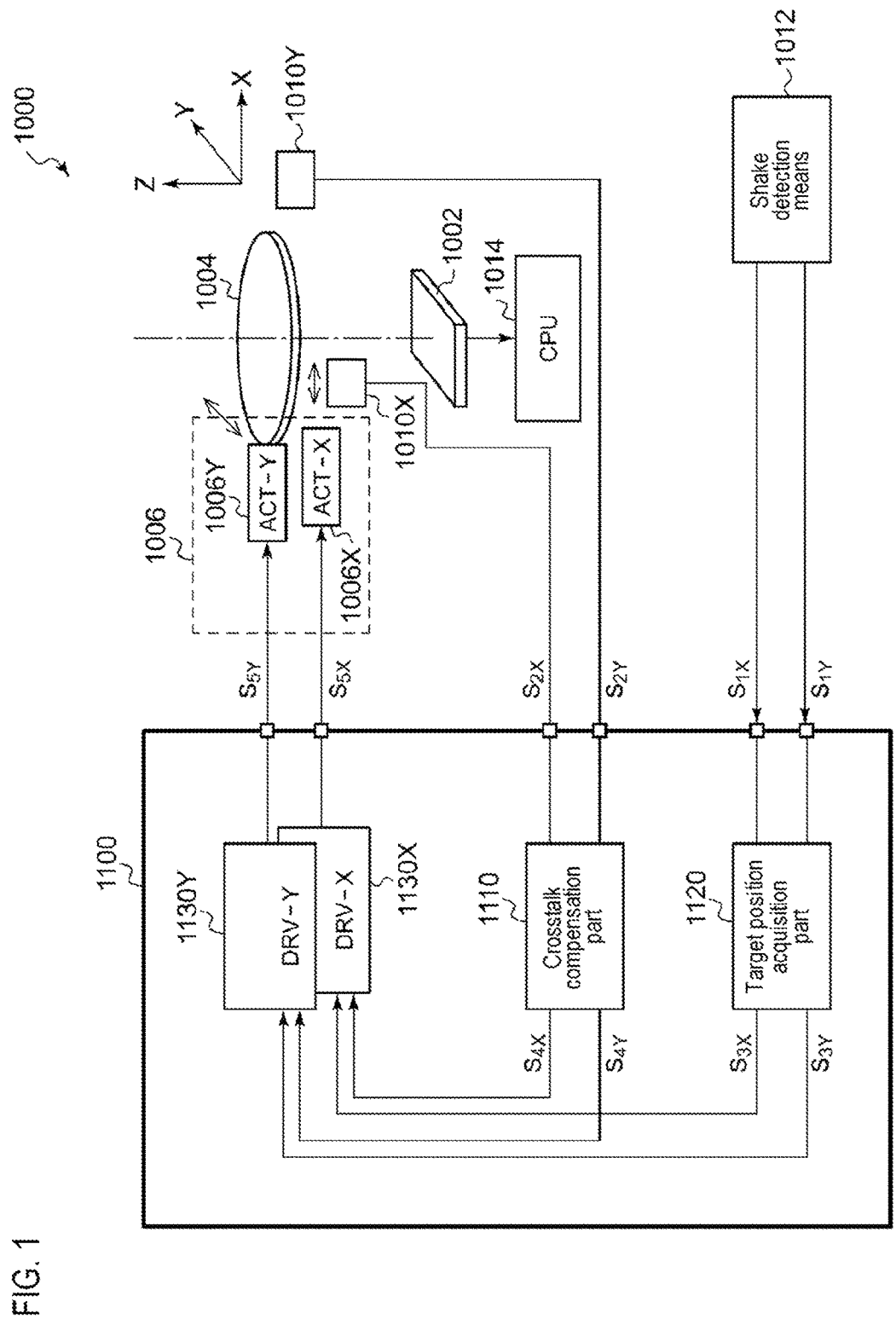
FIG. 1 is a diagram illustrating a basic configuration of an imaging device having a camera shake correction function according to an embodiment of the present disclosure.

Embodiments of the present disclosure will be now described in detail with reference to the drawings. Like or equivalent components, members, and processes illustrated in each drawing are given like reference numerals and a repeated description thereof will be properly omitted. Further, the embodiments are presented by way of example only, and are not intended to limit the present disclosure, and any feature or combination thereof described in the embodiments may not necessarily be essential to the present disclosure.

In the present disclosure, "a state where a member A is connected to a member B" includes a case where the member A and the member B are physically directly connected or even a case where the member A and the member B are indirectly connected through any other member that does not affect an electrical connection state between the members A and B or does not impair functions and effects achieved by combinations of the members A and B.

Similarly, "a state where a member C is installed between a member A and a member B" includes a case where the member A and the member C or the member B and the member C are indirectly connected through any other member that does not affect an electrical connection state between the members A and C or the members B and C or does not impair function and effects achieved by combinations of the members A and C or the members B and C, in addition to a case where the member A and the member C or the member B and the member C are directly connected.

FIG. 1 is a diagram illustrating a basic configuration of an imaging device 1000 having a camera shake correction function according to an embodiment of the present disclosure. The imaging device 1000 is a camera module built in a digital camera, a digital video camera, a smartphone, or a tablet terminal. In FIG. 1, only blocks related to camera shake correction are illustrated, and blocks related to autofocus are omitted.

The imaging device 1000 includes an imaging element 1002, an imaging lens 1004, an actuator 1006, an actuator driver 1100, a position detection means 1010, and a shake detection means 1012.

The imaging lens 1004 is supported so as to be displaceable in a first direction (X direction) and a second direction (Y direction) in a plane perpendicular to its optical axis. The imaging element 1002 captures an image that has passed through the imaging lens 1004.

The actuator 1006 positions the imaging lens 1004 in the first direction (X direction) and the second direction (Y direction). Specifically, the actuator 1006 includes a first actuator 1006X for positioning the imaging lens 1004 in the X direction and a second actuator 1006Y for positioning the imaging lens 1004 in the Y direction.

In the camera shake correction, since it is necessary to accurately position the imaging lens 1004, feedback control (closed-loop control) is adopted. The position detection means 1010 includes a magnetic detection element such as, for example, a Hall sensor, and generates a position detection signal (Hall signal) $S_2$ indicating a position of the imaging lens 1004.

The position detection means 1010 includes a first position detection means 1010X for generating a first position detection signal $S_{2X}$ indicating a position (displacement amount) of the imaging lens 1004 in the first direction (X direction) and a second position detection means 1010Y for generating a second position detection signal $S_{2Y}$ indicating a position of the imaging lens 1004 in the second direction (Y direction).

The shake detection means 1012 is, for example, a gyro sensor, and detects shake of the imaging device 1000. Specifically, the shake detection means 1012 generates a shake detection signal $S_{1X}$ in a yaw direction and a shake detection signal $S_{1Y}$ in a pitch direction.

The actuator driver 1100 receives a shake detection signal $S_1$ indicating an amount of shake detected by the shake detection means 1012, and controls the actuator 1006 such that the shake is canceled out. Specifically, the imaging lens 1004 is positioned at a target position in the X axis direction and the Y axis direction based on the shake detection signal $S_{1X}$ in the yaw direction and the shake detection signal $S_{1Y}$ in the pitch direction.

Ideally, only the first position detection means 1010X has sensitivity and the second position detection means 1010Y has no sensitivity to the displacement of the imaging lens 1004 in the first direction (X direction). Similarly, ideally, only the second position detection means 1010Y has sensitivity and the first position detection means 1010X has no sensitivity to the displacement of the imaging lens 1004 in the second direction (Y direction). However, in reality, the first position detection means 1010X may have sensitivity to the displacement in the second direction (Y direction), and the second position detection means 1010Y may have sensitivity to the displacement in the first direction (X direction). In the present disclosure, this will be referred to as a crosstalk.

In other words, the first position detection signal $S_{2X}$ includes a crosstalk component caused by displacing the imaging lens 1004 in the second direction (Y direction), and the second position detection signal $S_{2Y}$ includes a crosstalk component caused by displacing the imaging lens 1004 in the first direction (X direction).

Figure 2:
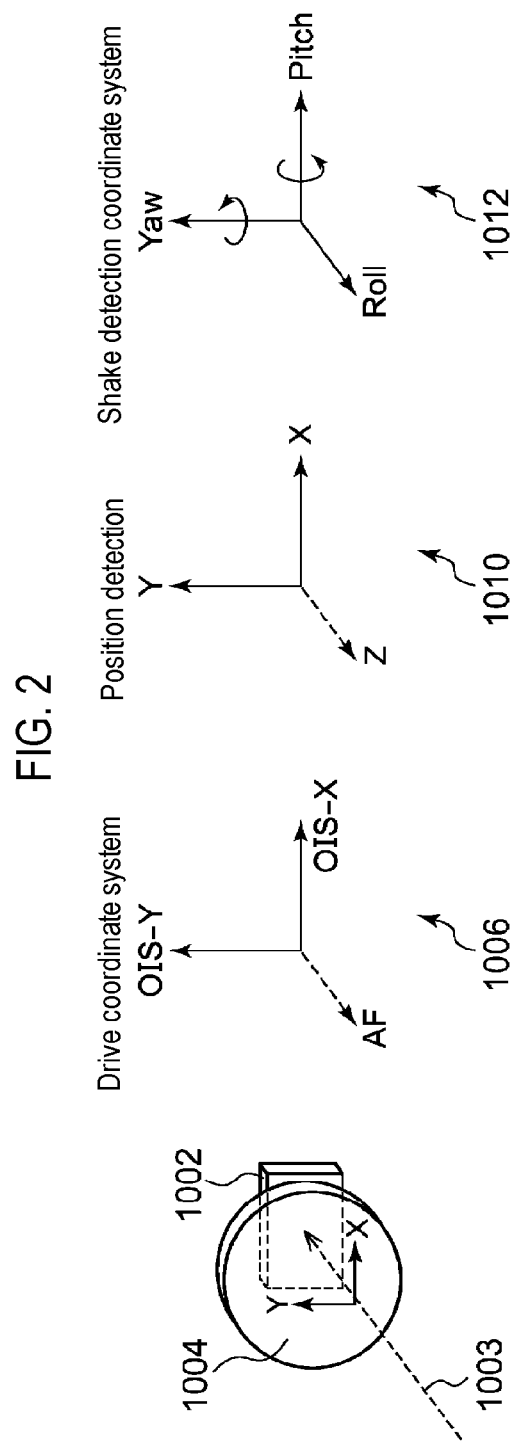
FIG. 2 is a diagram illustrating a coordinate system of the imaging device.

FIG. 2 is a diagram illustrating a coordinate system of the imaging device. The imaging device has a total of four coordinate systems such as a drive coordinate system of the actuator, a coordinate system of the position detection means (position detection coordinate system), a coordinate system of the shake detection means (shake detection coordinate system), and a coordinate system of the imaging element (pixel coordinate system). The drive coordinate system has an X axis of optical image stabilization (OIS-X), a Y axis of optical image stabilization (OIS-Y), and an axis in an AF direction. The position detection coordinate system has an X axis corresponding to the OIS-X axis and a Y axis corresponding to the OIS-Y axis. The shake detection coordinate system has a pitch axis and a yaw axis.

In the ideal imaging device, as illustrated in FIG. 2, the four coordinate systems coincide with one another. Specifically, the X axis of the imaging element, the X axis of the drive coordinate system (actuator), the X axis of the position detection coordinate system (position detection means), and the pitch axis of the detection coordinate system (gyro sensor) of the shake element are parallel to each other. The Y axis of the imaging element, the Y axis of the drive coordinate system, the Y axis of the position detection coordinate system, and the yaw axis of the shake detection coordinate system are also parallel to each other.

Figure 3:
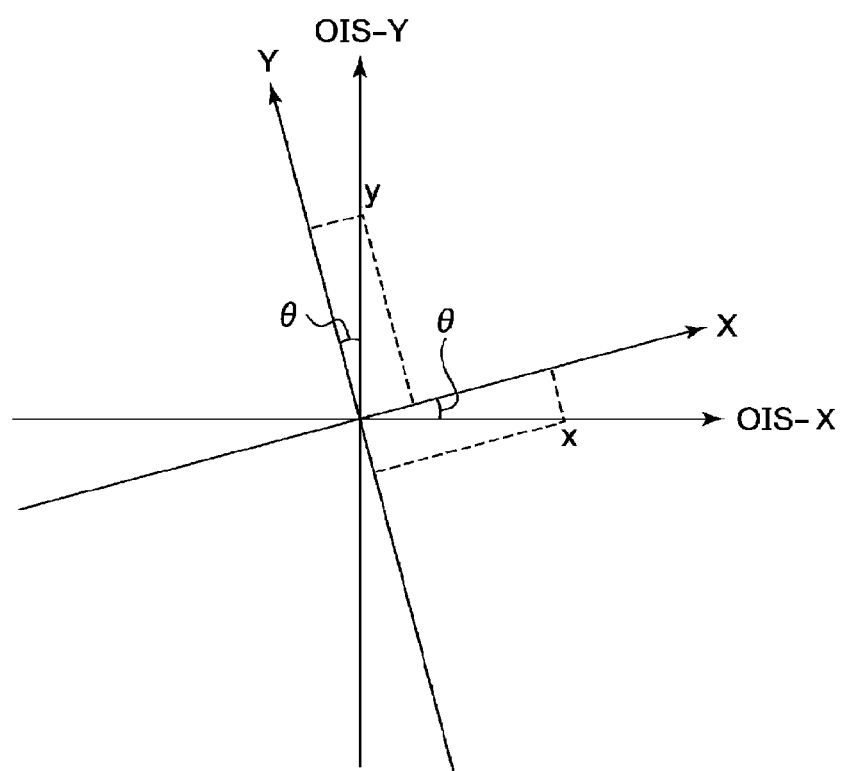
FIG. 3 is a diagram illustrating crosstalk.

However, in the actual imaging device, it is difficult to match the four coordinate systems due to the assembly accuracy. Although a crosstalk may be caused by arbitrary two-axis deviation, crosstalk that occurs due to a mismatch between the position detection coordinate system and the drive coordinate system will be described here. FIG. 3 is a diagram illustrating a crosstalk. For ease of understanding, it is illustrated that the X axis and the Y axis of the position detection coordinate system are orthogonal to each other, the OIS-X axis and the OIS-Y axis of the drive coordinate system are orthogonal to each other, and the XY plane of the position detection coordinate system and the OIS-XY plane of the drive coordinate system are parallel to each other, and the position detection coordinate system rotates in the counterclockwise direction θ with respect to the drive coordinate system.

Assuming that the imaging lens 1004 is positioned at the coordinate x in the direction of the drive axis OIS-X, a displacement of X=x·cos θ appears in the X axis direction of the position detection coordinate system, and a displacement of Y=−x·sin θ appears in the Y axis direction of the position detection coordinate system. This −x·sin θ is a crosstalk component included in the second position detection signal $S_{2Y}$.

When the imaging lens 1004 is positioned at the coordinate y in the direction of the drive axis OIS-Y, a displacement of Y=y·cos θ appears in the Y axis direction of the position detection coordinate system and a displacement of X=y·sin θ appears in the X axis direction of the position detection coordinate system. This y·sin θ is a crosstalk component included in the first position detection signal $S_{2X}$.

When the imaging lens 1004 is positioned at the coordinate (x, y) of the drive coordinate system, the following equations may be obtained.

$$X = x \cdot \cos\theta + y \cdot \sin\theta \qquad \text{Eq. (1)}$$

$$Y = y \cdot \cos\theta - x \cdot \sin\theta \qquad \text{Eq. (2)}$$

Returning to FIG. 1, the actuator driver 1100 includes a crosstalk compensation part 1110, a target position acquisition part 1120, and a driving part 1130. The crosstalk compensating part 1110 corrects the first position detection signal $S_{2X}$ and the second position detection signal $S_{2Y}$ such that the crosstalk components included therein are reduced. The crosstalk compensation part 1110 supplies a corrected position detection signal Sox obtained by removing the crosstalk component from the position detection signal $S_{2X}$, and a corrected position detection signal $S_{4Y}$ obtained by removing the crosstalk component from the position detection signal $S_{2Y}$, to the driving part 1130.

Based on the shake detection signals $S_{1X}$ and $S_{1Y}$ from the shake detection means 1012, the target position acquiring part 1120 acquires a first position command value $S_{3X}$ indicating a target position (target displacement amount) of the imaging lens 1004 in the X direction, and a second position command value $S_{3Y}$ indicating a target position (target displacement amount) of the imaging lens 1004 in the Y direction. For example, when the shake detection means 1012 is a gyro sensor, the shake detection signal $S_{1X}$ indicates a shake angular velocity $\omega_Y$ in the yaw direction and the shake detection signal $S_{1Y}$ indicates a shake angular velocity $\omega_P$ in the pitch direction, the target position acquisition part 1120 may integrate the shake detection signal $S_{1X}$ to generate the first position command value $S_{3X}$ and integrate the shake detection signal $S_{1Y}$ to generate the second position command value $S_{3Y}$.

The driving part 1130 controls the actuator 1006 based on the corrected first position detection signal $S_{4X}$ and the corrected second position detection signal $S_{4Y}$. Specifically, the first driver 1130X feedback-controls a first drive signal $S_{5X}$ to be supplied to the first actuator 1006X such that the corrected first position detection signal $S_{4X}$ approaches the first position command value $S_{3X}$. Similarly, the second driving part 1130Y feedback-controls a second driving signal $S_{5Y}$ to be supplied to the second actuator 1006Y such that the corrected second position detection signal $S_{3Y}$ approaches the second position command value $S_{3Y}$.

Next, crosstalk compensation performed by the crosstalk compensation part 1110 will be described.

Assuming that the detection sensitivity of the first position detection means 1010X is $k_x$ and the detection sensitivity of the second position detection means 1010Y is $k_y$, when the displacement in the X axis direction of the detection coordinate system is x and the displacement in the Y axis direction is y, the value $H_x$ of the first detection signal $S_{2X}$ and the value $H_y$ of the second detection signal $S_{2Y}$ may be expressed as Eqs. (3) and (4).

$$H_x = k_x' \cdot X \qquad \text{Eq. (3)}$$

$$H_y = k_y \cdot Y \qquad \text{Eq. (4)}$$

It should be noted that the relational equations (3) and (4) are established when the linearity of the position detection signal and the displacement amount is compensated.

By substituting Eqs. (1) and (2) into Eqs. (3) and (4), Eqs. (5) and (6) may be obtained.

$$H_x = k_x \cdot \{x \cdot \cos\theta + y \cdot \sin\theta\} \qquad \text{Eq. (5)}$$

$$H_y = k_y \cdot \{y \cdot \cos\theta - x \cdot \sin\theta\} \qquad \text{Eq. (6)}$$

Crosstalk compensation may be recognized as a process of calculating a correct coordinate (x, y) positioned from $H_x$ and $H_y$.

$$k_x \cos\theta \cdot x + k_x \sin\theta \cdot y = H_x$$

$$k_y \sin\theta \cdot x + k_y \cos\theta \cdot y = H_y$$

Solving this simultaneous linear equation with two unknowns yields Eqs. (7) and (8).

$$x = \{k_y \cos\theta \cdot H_x - k_x \sin\theta \cdot H_y\}/\{k_x k_y\} \qquad \text{Eq. (7)}$$
$$= \cos\theta/k_x \cdot H_x - \sin\theta/k_y \cdot H_y$$

$$y = \{k_y \sin\theta \cdot H_x + k_x \cos\theta \cdot H_y\}/\{k_x k_y\} \qquad \text{Eq. (8)}$$
$$= \sin\theta/k_x \cdot H_x + \cos\theta/k_y \cdot H_y$$

$\sin\theta$, $\cos\theta$, $k_x$, and $k_y$ may be obtained in advance in a calibration process. Then, $\Delta X$ and $\Delta Y$ may be calculated based on the following equations by calculating four coefficients $A = \cos\theta/k_x$, $B = -\sin\theta)/k_y$, $C = \sin\theta/k_x$, and $D = \cos\theta/k_y$ in advance.

$$x = A \cdot H_x + B \cdot H_y$$

$$y = C \cdot H_x + D \cdot H_y$$

It may not be easy to individually measure $\sin\theta$, $\cos\theta$, $k_x$, and $k_y$. In this case, crosstalk may be more easily compensated by a process described in the embodiment to be described hereinbelow.

The configuration of the imaging device 1000 has been described above. According to the imaging device 1000, since influence of crosstalk can be corrected, it is possible to perform high-precision camera shake correction.

The present disclosure is recognized by the block diagram or the circuit diagram of FIG. 1 or intended to cover various devices and circuits derived from the aforementioned description, but is not limited to the specific configuration. Hereinafter, more specific embodiments or modifications will be described based on some embodiments in order to help understand and clarify the essence of the present disclosure and a circuit operation thereof, rather than to narrow the scope of the present disclosure.

Figure 4:
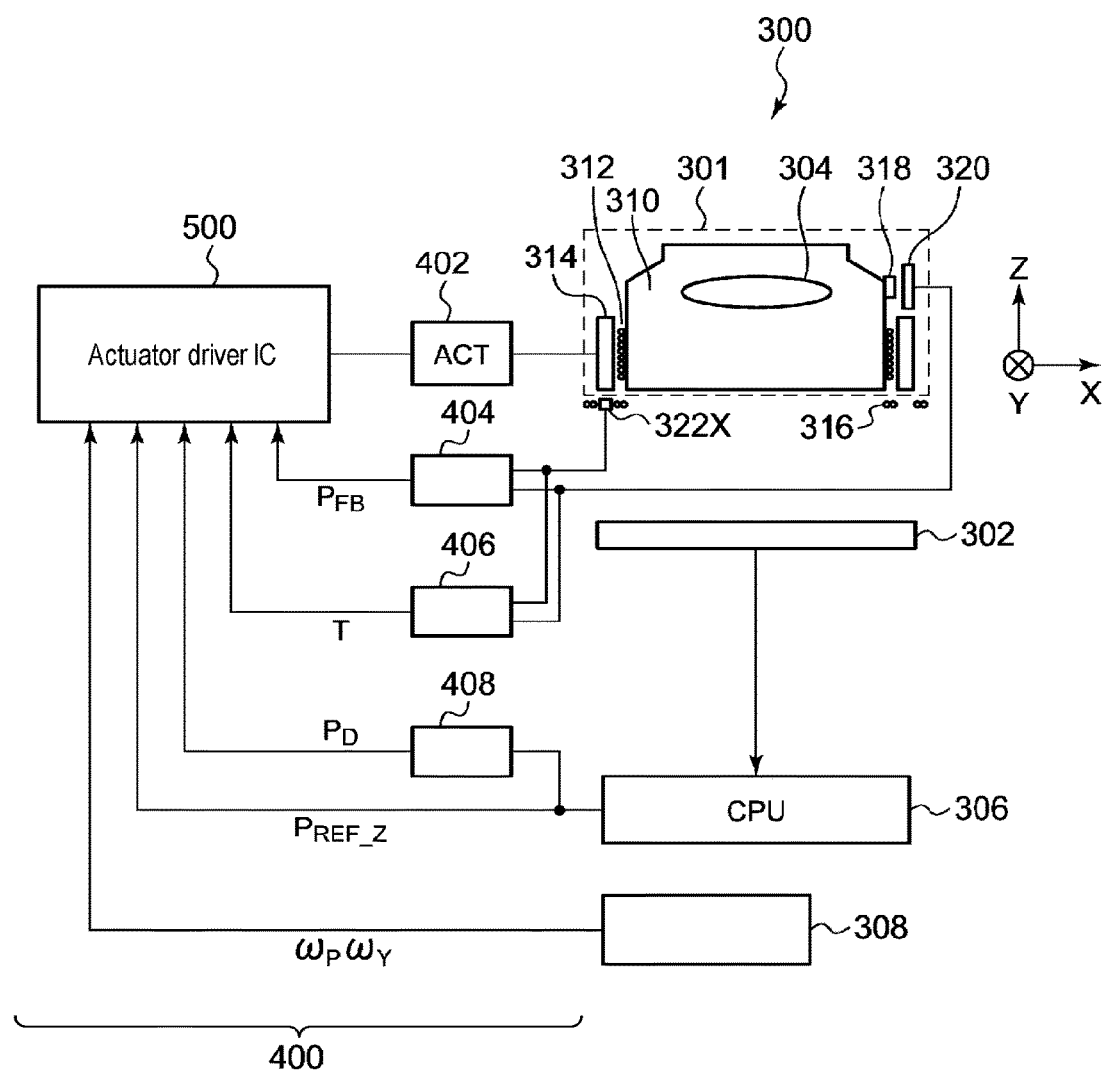
FIG. 4 is a diagram illustrating the imaging device.

First, the configuration of the imaging device will be described. FIG. 4 is a diagram illustrating the imaging device. An imaging device 300 is a camera module built in a digital camera, a digital video camera, a smartphone, or a tablet terminal. The imaging device 300 includes an OIS movable part 301, an imaging element 302, a processor 306, a shake detection means 308, and a lens control device 400.

The imaging device 300 corresponds to the imaging device 1000 of FIG. 1, the imaging element 302 corresponds to the imaging element 1002 of FIG. 1, the imaging lens 304 corresponds to the imaging lens 1004 of FIG. 1, the processor 306 corresponds to the CPU 1014 of FIG. 1, and the lens control device 400 corresponds to the actuator driver 1100 and the actuator 1006 in FIG. 1.

The imaging lens 304 is disposed on the optical axis of light incident to the imaging element 302. The lens control device 400 displaces the imaging lens 304 in the optical axis direction (Z axis direction) and in directions perpendicular to the optical axis (X axis and Y axis directions) in a plane parallel to the imaging element 302. In the AF operation, the processor 306 generates a position command value $P_{REF\_Z}$ (contrast AF) such that the contrast of the image captured by the imaging element 302 becomes high. Alternatively, the processor may be installed outside the imaging element 302, or the position command value $P_{REF\_Z}$ may be generated based on the output from the AF sensor embedded in the imaging surface (phase difference AF). For the OIS, position command values $P_{REF\_X}$ and $P_{REF\_Y}$ in the X axis direction and the Y axis direction are generated based on the outputs (the pitch angular velocity $\omega_P$ and the yaw angular velocity $\omega_Y$) from the shake detection means 308.

The lens control device 400 controls the actuator 402 by position feedback. Specifically, the lens control device 400 includes an actuator 402, a position detection element (AF, OIS) 404, a temperature detection element (AF, OIS) 406, and an actuator driver integrated circuit (IC) 500. The actuator 402 is, for example, a voice coil motor, and the imaging lens 304 is mounted on a holder 310 and is supported to be movable in the Z axis direction. An AF coil 312 is wound around the holder 310, and a permanent magnet 314 is disposed so as to face the AF coil 312. By supplying electric power to the AF coil 312, the imaging lens 304 and the holder 310 are integrally driven in the Z axis direction by magnetic interaction with the permanent magnet 314.

On the other hand, the entire AF driving mechanism including the permanent magnet 314 (OIS movable part 301) is supported to be movable in the X axis direction and the Y axis direction, and the entire OIS movable part 301 is driven in the X axis direction and the Y axis direction by supplying electric power to an OIS coil 316 disposed in a fixing part, by magnetic interaction with the permanent magnet 314. The fixing part of the voice coil motor is fixed to the housing of the imaging device 300.

A magnetic detection means such as, for example, a Hall element or the like, is often used as the position detection element 404, and will be described here based on the assumption that it is a Hall element. A permanent magnet 318 is installed in the AF movable part of the voice coil motor, for example, the holder 310, and an AF Hall element 320 is installed in a non-moving part of an AF. By a combination thereof, the position detection element 404 for AF is formed.

On the other hand, a Hall element 322 for X axis for OIS is installed in the fixing part facing the permanent magnet 314. By a combination thereof, the position detection element 404 for OIS is formed. Although the Hall element 322X is illustrated only for the X axis in FIG. 4, there is also a Hall element (322Y) for the Y axis in a position which is hidden behind the shadow in the drawing. The position detection element 404 generates an electric signal (hereinafter, referred to as a position detection signal $P_{FB}$) corresponding to the current position of the imaging lens 304, and the position detection signal $P_{FB}$ is fed back to the actuator driver IC 500.

The actuator driver IC 500 is a functional IC integrated on a single semiconductor substrate. The term "integration" as used herein may include a case where all the components of a circuit are formed on a semiconductor substrate or a case where main components of a circuit are integrated, and some resistors, capacitors, or the like may be installed outside the semiconductor substrate in order to adjust circuit constants. By integrating the circuit on one chip, it is possible to reduce the circuit area and to keep the characteristics of the circuit elements uniform.

The actuator driver IC 500 feedback-controls the actuator 402 for each of the X, Y, and Z axes such that the fed-back position detection signal $P_{FB}$ coincides with the position command value $P_{REF}$. The position detection signal $P_{FB}$ generally refers to the component $P_{FB\_Z}$ in the Z axis direction and the components $P_{FB\_X}$ and $P_{FB\_Y}$ in the X axis direction and the Y axis direction. In the following description, in the case where the process common to three axes is described, they are simply expressed as $P_{FB}$ or $P_{REF}$.

By detecting and feeding back the position of the imaging lens 304 so as to be used for position control, it is possible to suppress the transient vibration in step response so as to accelerate the convergence or to improve the positioning accuracy to the target position.

When the imaging lens 304 is moved in one direction (for example, the X direction), in the case where a so-called crosstalk occurs in which a position detection element in another direction (for example, the Y direction) detects displacement, the actuator driver IC 500 corrects a crosstalk component that leaks in the position detection signal.

After performing the crosstalk correction, ideally, it is desirable that a relationship (hereinafter, also referred to as x-y characteristics) between an output of the position detection element 404, that is, the position detection signal ($P_{FB\_X}$, $P_{FB\_Y}$) or its corresponding position command value ($P_{REF\_X}$, $P_{REF\_Y}$) (hereinafter, also referred to as variable y), and the actual displacement (hereinafter, referred to as variable x) of the imaging lens 304 (actuator 402) be linear and invariant with respect to temperature fluctuation and the like, with no variation. However, in reality, the x-y characteristics are nonlinear, there is variation for each of the imaging devices 300, and their relationship (x-y characteristics) varies depending on the temperature of the position detection element 404. Therefore, it may be sufficient to perform the linear compensation and the temperature compensation on the position detection signal before the crosstalk correction is performed.

The linear compensation is achieved by correcting the value of the position detection signal $P_{FB}$ so as to transform a function indicating the relationship between the position detection signal $P_{FB}$ and the actual displacement into an ideal linear function (straight line). The temperature compensation is realized by correcting the slope or offset of the relationship between the position detection signal $P_{FB}$ which changes according to the temperature change and the actual displacement for each temperature.

When the linear compensation is performed, it is necessary to obtain actual lens displacement information. In the case of linear compensation of AF, it is easy to obtain actual displacement information using a laser displacement meter or the like. However, in the case of linear compensation of OIS, since the lens or holder to be subjected to displacement measurement is within a housing of the actuator, it is difficult to measure the displacement with the laser displacement meter. Therefore, in the OIS, it may be sufficient to measure an actual displacement using image information.

Measurement of displacement using the image information will be described. When the imaging lens 304 is displaced in the X axis direction or the Y axis direction, the image of an object of a specific pattern also moves on the imaging element 302. That is, the imaging element 302 acts as an image displacement detection element 408, and outputs a displacement detection signal PD. The displacement amount of the image detected here is obtained by multiplying the pixel pitch by how many pixels the image of the specific pattern has moved. The displacement amount of the image thus obtained is not the same as the actual displacement amount of the lens. This is because an optical magnification works between them. Basically, however, they have a proportional relationship, and when it is used for crosstalk compensation, since the ratio between the displacement in the X direction and the displacement in the Y direction is necessary, it may be used as corresponding to the actual displacement of the lens. When the linear compensation is performed, whether a nonlinear function is determined or an ideal linear function is determined, a difference between the displacement of the lens and the displacement of the image has no effect, because the actual displacement of the lens is expressed as the displacement of the image. Only the position detection signal $P_{FB}$ detected by the Hall elements 320, 322X, 322Y is to be subjected to correction.

Next, the temperature compensation will be described. For this correction, the temperature detection element 406 is installed. The temperature detection element 406 detects the temperature of the position detection element 404. When the temperature compensation of AF is performed, the temperature of the Hall element 320 for AF is detected. When temperature compensation of OIS is performed, the temperature of the Hall element 322 for OIS is detected. The temperature detection can be performed by using a change in internal resistance of the Hall element due to the temperature. When the temperature of the position detection element 404 and the ambient temperature coincide with each other or have a strong correlation, the temperature detection element 406 may measure the ambient temperature. The detected temperature information T is input to the actuator driver IC 500. The actuator driver IC 500 corrects drive control of the actuator 402 based on the temperature information T. The temperature detection element 406 may be a thermistor, a posistor, a thermocouple or the like.

Hereinafter, the crosstalk compensation will be described with reference to a first embodiment and a second embodiment of the present disclosure. Further, the linear compensation and the temperature compensation will be described with reference to a third embodiment of the present disclosure.

First Embodiment

Figure 5A:
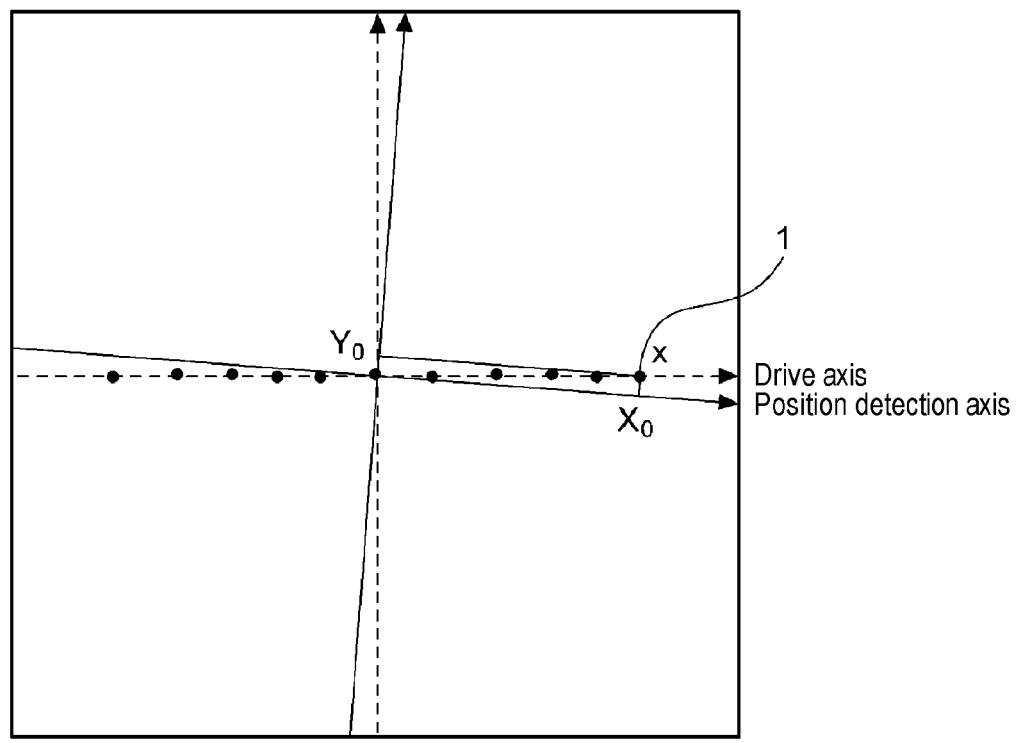
FIG. 5A and FIG. 5B are diagrams illustrating a deviation (crosstalk) between a drive axis and a position detection axis in an imaging device according to a first embodiment of the present disclosure.
Figure 5B:
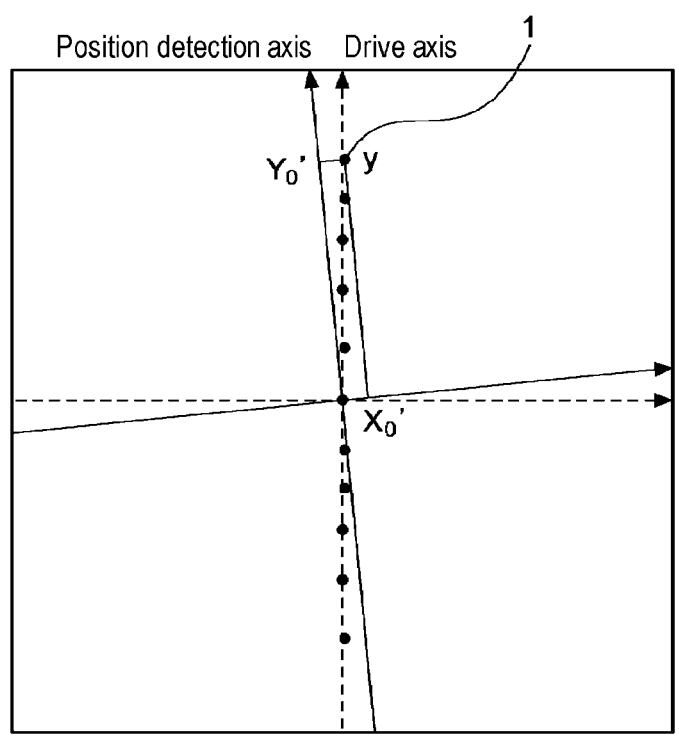

A first embodiment of the present disclosure will be described with reference to FIG. 5A and FIG. 5B. FIG. 5A and FIG. 5B are diagrams illustrating a deviation (crosstalk) between a drive axis and a position detection axis in an imaging device according to the first embodiment of the present disclosure. Specifically, FIG. 5A illustrates an X component and a Y component of a position detection signal when driven in the X axis direction, and FIG. 5B illustrates a Y component and an X component of the position detection signal when driven in the Y axis direction.

In the first embodiment, a crosstalk compensation when a drive axis of an actuator and a position detection axis of a Hall element are inclined will be described. That is, a crosstalk leaks in the position detection signal in the Y direction despite the displacement in the x axis direction of driving or a crosstalk leaks in the position detection signal in the X direction despite the displacement in the y axis direction of driving. A detection sensitivity of the Hall element may be different between the X direction and the Y direction, and the Hall detection sensitivity in the X direction is defined as $S_x$, and a Hall detection sensitivity in the Y direction is defined as $S_y$. A Hall detection sensitivity refers to a ratio of the change amount of a position detection signal of the Hall element to the displacement.

First, as illustrated in FIG. 5A, a current is applied to an OIS coil in the X direction of the actuator to displace a lens. The Hall elements of X and Y respectively output position detection signals with respect to a displacement amount of the lens. Plot 1 in the figure plots the values of the position detection signals of X and Y with respect to each displacement amount. Assuming that their relationship linearly changes, the displacements on X and Y position detection axes at the displacement x are set to $X_0$ and $Y_0$. A ratio between $Y_0$ and $X_0$ at this time denotes a slope of the drive axis and the position detection axis, and if a proportional constant is $C_x$, the following equation is obtained.

$$Y_0 = C_x \cdot X_0 \qquad \text{Eq. (9)}$$

Assume that the position detection signals of the Hall element at this time are respectively $H_x$ and $H_y$ in the X direction and the Y direction, and a ratio of $H_y$ and $H_x$ is $\alpha$. That is, $$\begin{aligned}\alpha &= H_y/H_x = (S_y \cdot Y_0)/(S_x \cdot X_0) \\ &= (S_y \cdot C_x \cdot X_0)/(S_x \cdot X_0) \\ &= (S_y/S_x) \cdot C_x.\end{aligned} \qquad \text{Eq. (10)}$$

It is also necessary to pay attention to the sign of $C_x$. In the example of FIG. 5A, since a positive crosstalk occurs in the position detection signal in the Y direction when the position detection signal in the X direction changes to the positive side, $C_x$ has a positive slope. In the case of negative crosstalk, it is necessary to set the slope to be negative.

Similarly, as illustrated in FIG. 5B, a current is applied to the OIS coil in the Y direction of the actuator to displace the lens. The Hall elements of X and Y respectively output position detection signals with respect to the displacement of the lens. Assuming that the displacements of the Y and X position detection axes at the displacement y are $Y_0'$ and $X_0'$ respectively, a ratio between $X_0'$ and $Y_0'$ at this time represents the slope of the drive axis and the position detection axis, and if the proportional constant is $C_y$, the following equation is obtained.

$$X_0' = C_y \cdot Y_0' \qquad \text{Eq. (11)}$$

The position detection signals of the Hall element at this time are respectively $H_x$ and $H_y$ in the X direction and the Y direction, and a ratio between $H_y$ and $H_x$ is $\beta$. That is, $$\begin{aligned}\beta &= H_x/H_y = (S_x \cdot X_0')/(S_y \cdot Y_0') \\ &= (S_x \cdot C_y \cdot Y_0')/(S_y \cdot Y_0') = (S_x/S_y) \cdot C_y.\end{aligned} \qquad \text{Eq. (12)}$$

It is also necessary to pay attention to a sign of $C_y$. In the example of FIG. 5B, since a positive crosstalk occurs in the position detection signal in the X direction when the position detection signal in the Y direction changes to the positive side, $C_y$ has a positive slope. In the case of negative crosstalk, it is necessary to set the slope to be negative.

From the above, when the position detection signals of the Hall elements after the crosstalk correction with respect to the displacements X and Y on the position detection axis are respectively represented by $H_x'$ and $H_y'$, the following equations are obtained.

$$H_x' = H_x - S_x \cdot C_y \cdot Y = H_x - \beta \cdot H_y \qquad \text{Eq. (13)}$$

$$H_y' = H_y - S_y \cdot C_x \cdot X = H_y - \alpha \cdot H_x \qquad \text{Eq. (14)}$$

Thus, the crosstalk correction can be realized by outputting $H_x'$ and $H_y'$ to the detected position detection signals $H_x$ and $H_y$.

Eqs. (13) and (14) are based on the assumption that the Hall detection sensitivities $S_x$ and $S_y$ are the same at the time of crosstalk measurement and crosstalk compensation. When the crosstalk is measured in a module process to determine a correction constant and the crosstalk correction is performed, the same Hall detection sensitivity can be obtained. However, for example, when the crosstalk compensation is performed in a module state by using the correction constant measured in a manufacturing process of the actuator, there may be a case where a Hall amplifier gain at the time of measurement by the actuator and a calibrated Hall amplifier gain when actually embedded in the module are different. In this case, the correction constant may be normalized by a ratio of the Hall position detection sensitivities in the X direction and the Y direction, in some embodiments.

Specifically, if the Hall position detection sensitivities at the time of crosstalk correction are $S_x'$ and $S_y'$, Eqs. (13) and (14) are expressed as follows.

$$H_x' = H_x - S_x' \cdot C_y \cdot Y = H_x - S_x'/S_y' \cdot S_y/S_x \cdot \beta H_y \quad \text{Eq. (13')}$$

$$= H_x - S_x'/S_y' \cdot C_y \cdot H_y \quad \text{Eq. (13'')}$$

$$H_y' = H_y - S_y' \cdot C_x \cdot X = H_y - S_y'/S_x' \cdot S_x/S_y \cdot \alpha H_x \quad \text{Eq. (14')}$$

$$= H_y - S_y'/S_x' \cdot C_x \cdot H_x \quad \text{Eq. (14'')}$$

That is, when crosstalk is measured with α and β, the normalization of each position detection sensitivity is required for both the crosstalk measurement and the crosstalk compensation. When crosstalk is measured with $C_x$ and $C_y$, the normalization of the position detection sensitivity at the time of crosstalk compensation is required.

When it is necessary to measure the position detection sensitivity, displacement information of the lens is required. In order to obtain displacement information of the lens, a laser measurer may be used, or pixel displacement information may be used. When measuring the position detection sensitivity in the module state, since it is difficult to use the laser measurer, the pixel displacement information may be used in some embodiments, as described hereinbelow.

Figure 6A:
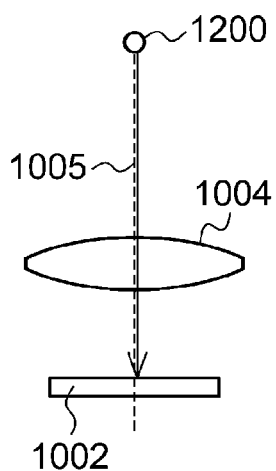
FIG. 6A to FIG. 6C are diagrams illustrating the principle of displacement measurement of a lens based on pixel shift.
Figure 6B:
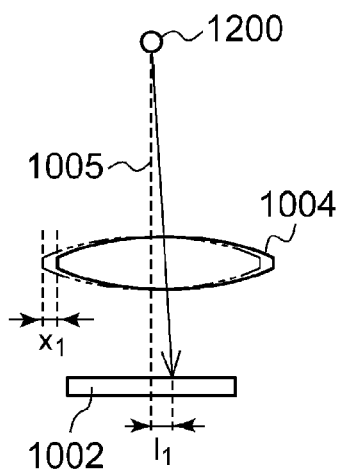
Figure 6C:
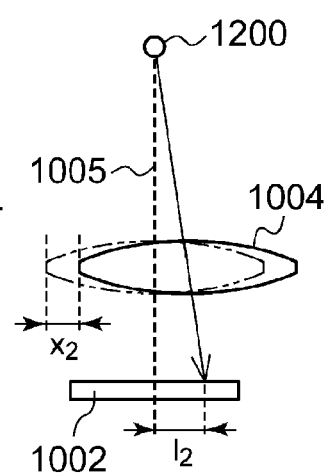

In a calibration process, an actual displacement of the lens 1004 is acquired based on a moving distance of an image captured by the imaging element 1002. FIG. 6A to FIG. 6C are diagrams illustrating a principle of displacement measurement of the lens 1004. An object (hereinafter, referred to as a standard subject 1200) is placed on an optical axis 1005 of the lens 1004, wherein its position is unchanged. An optical system is adjusted such that the standard subject 1200 forms an image on an imaging surface of the imaging element 1002. When the displacement is zero as illustrated in FIG. 6A, the standard subject 1200 forms an image at a center of the lens 1004. When the lens 1004 is displaced to the right as illustrated in FIG. 6B and FIG. 6C, a position at which the standard subject 1200 forms an image moves.

Moving distances $l_1$ and $l_2$ of an image-forming position (also simply referred to as an image) and displacements $x_1$ and $x_2$ of the lens 1004 have a one-to-one correspondence, and their relational equations may be derived by calculation from geometrical optics. Alternatively, an optical system having the same structure as a camera module 1000 (however, it is easy to irradiate a laser from a side) may be established and a relationship between the moving distance l and the displacement x of the lens 1004 may be measured using a laser displacement meter.

Figure 7:
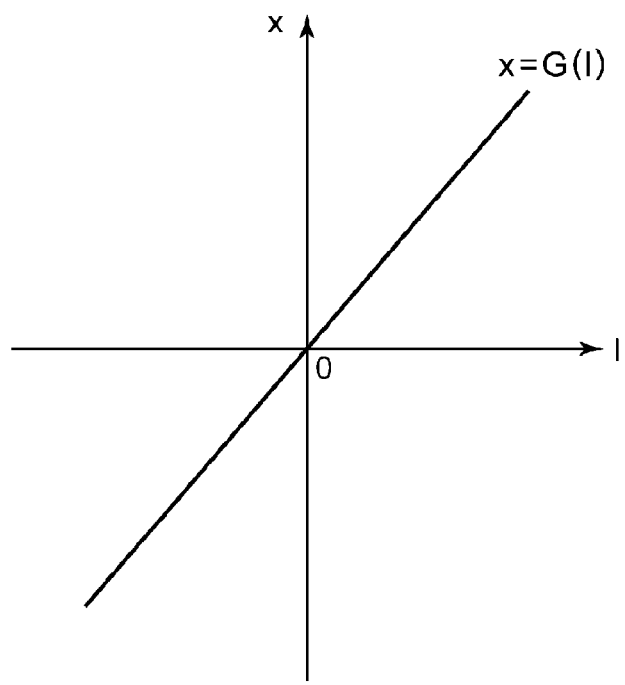
FIG. 7 is a diagram illustrating an example of a relationship between a moving distance of an image and a displacement x of a lens.

FIG. 7 is a diagram illustrating an example of the relationship between the moving distance l of the image and the displacement x of the lens. The moving distance l of the image may be derived by analyzing the image data captured by the imaging element 1002. Specifically, the moving distance l of the image may be derived by multiplying the number of pixels to which a position of the image has moved in the image by a pixel pitch.

Since a relational equation x=G(l) in FIG. 7 is uniquely determined depending on a configuration of the optical system, the actual displacement of the lens 1004 corresponding to the moving distance l of the image is uniquely determined.

Second Embodiment

Figure 8:
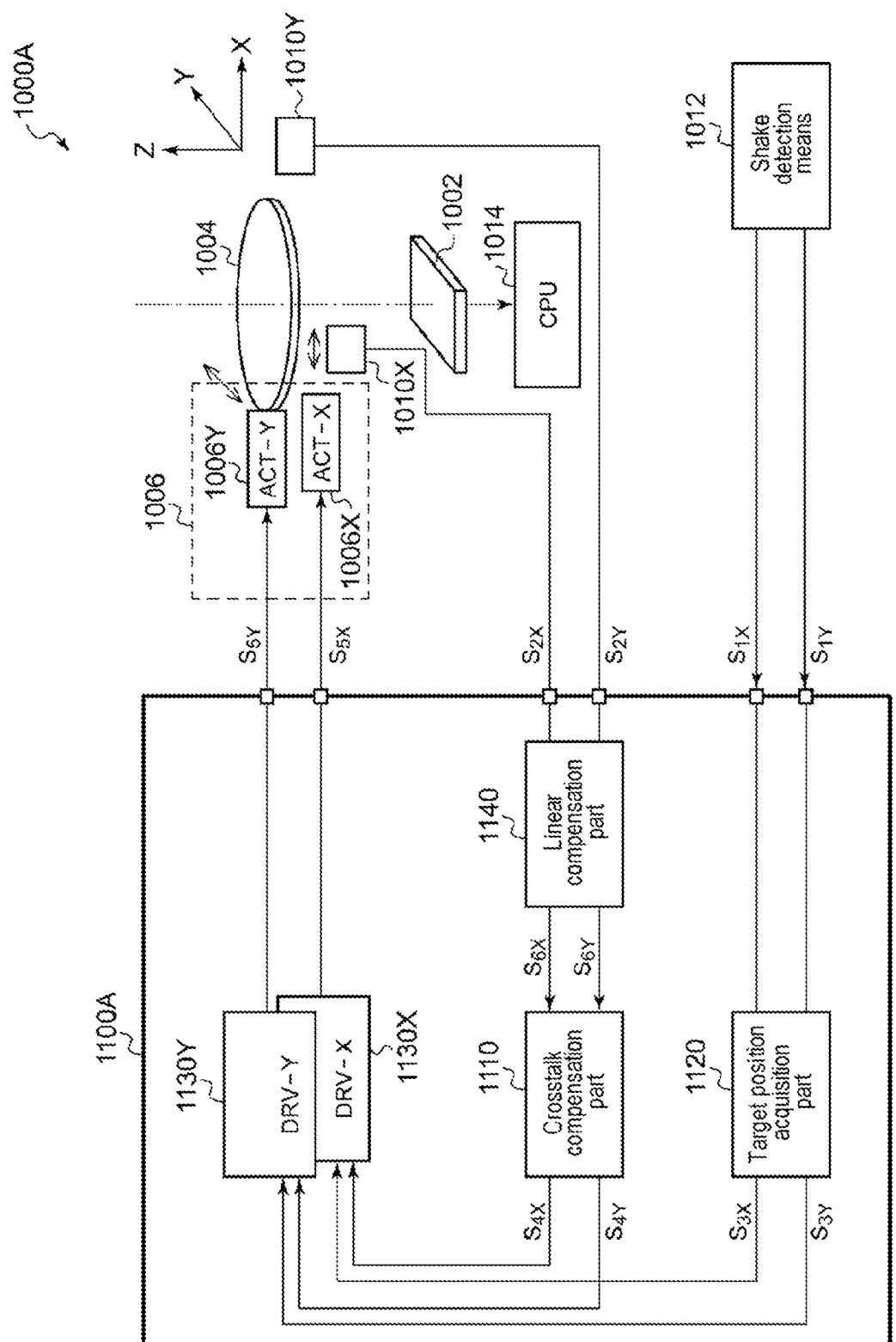
FIG. 8 is a block diagram of an actuator driver according to a second embodiment of the present disclosure.

In a second embodiment of the present disclosure, an actuator driver 1100A suitable for calibration based on pixel shift will be described. FIG. 8 is a block diagram of the actuator driver 1100A according to the second embodiment. The actuator driver 1100A further includes a linear compensation part 1140, in addition to the actuator driver 1100 in FIG. 1.

The linear compensation part 1140 corrects linearity of a relationship between a displacement of the imaging lens 1004 in a first direction and a first position detection signal $S_{2x}$ ($H_x$), and corrects linearity of a relationship between a displacement of the imaging lens 1004 in a second direction and a second position detection signal $S_{2y}$ ($H_y$).

A linear-compensated first position detection signal $S_{6X}$ ($H_x'$) includes a crosstalk component caused by displacing the imaging lens 1004 in the second direction, and a linear-compensated second position detection signal $S_{6Y}$ ($H_y'$) includes a crosstalk component caused by displacing the imaging lens 1004 in the first direction.

In the case of acquiring (calibrating) data necessary for linear compensation based on the pixel shift, there may be a case where crosstalk is introduced due to a deviation between the coordinate system (pixel coordinate system) of the imaging element 1002 and the position detection coordinate system. Thus, a situation in which a crosstalk leaks in the position detection signal in the Y direction may occur even though the image is displaced in the X axis direction of the pixel arrangement or a situation in which a crosstalk leaks in the position detection signal in the X direction may occur even though the image is displaced in the Y axis direction of the pixel arrangement. As in the first embodiment, the Hall detection sensitivity in the X direction is defined as $S_x$, and the Hall detection sensitivity in the Y direction is defined as $S_y$.

The crosstalk compensation part 1110 corrects the linear-compensated first position detection signal $S_{6X}$ ($H_x''$) and the linear-compensated second position detection signal $S_{6Y}$ ($H_y''$) such that the crosstalk components included therein are reduced.

Figure 9A:
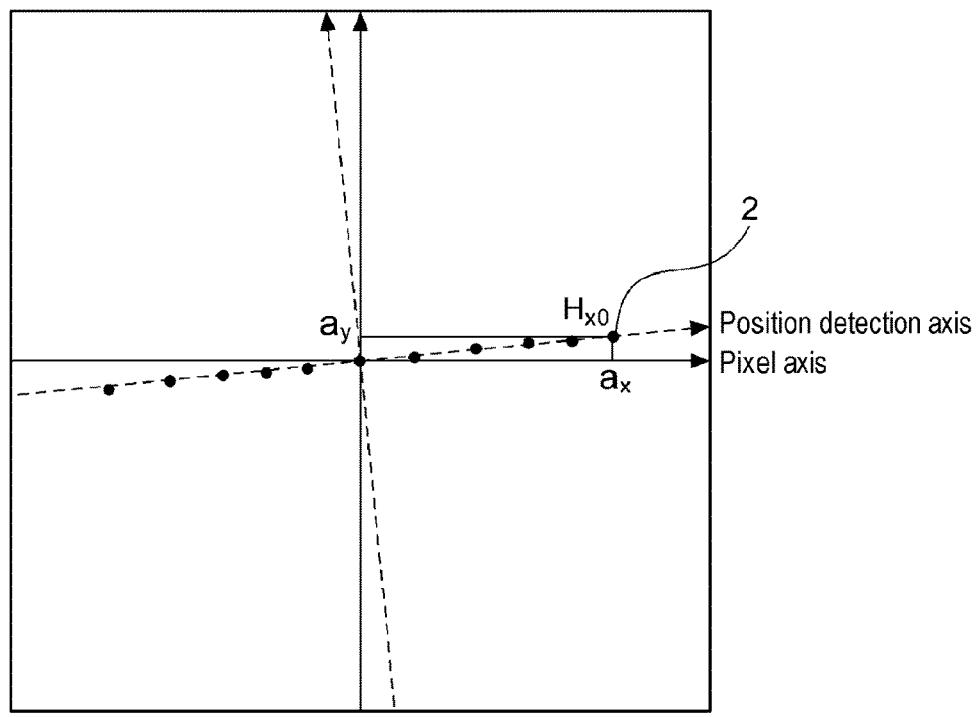
FIG. 9A and FIG. 9B are diagrams illustrating a deviation (crosstalk) between a pixel axis and a position detection axis in the imaging device according to the second embodiment.
Figure 9B:
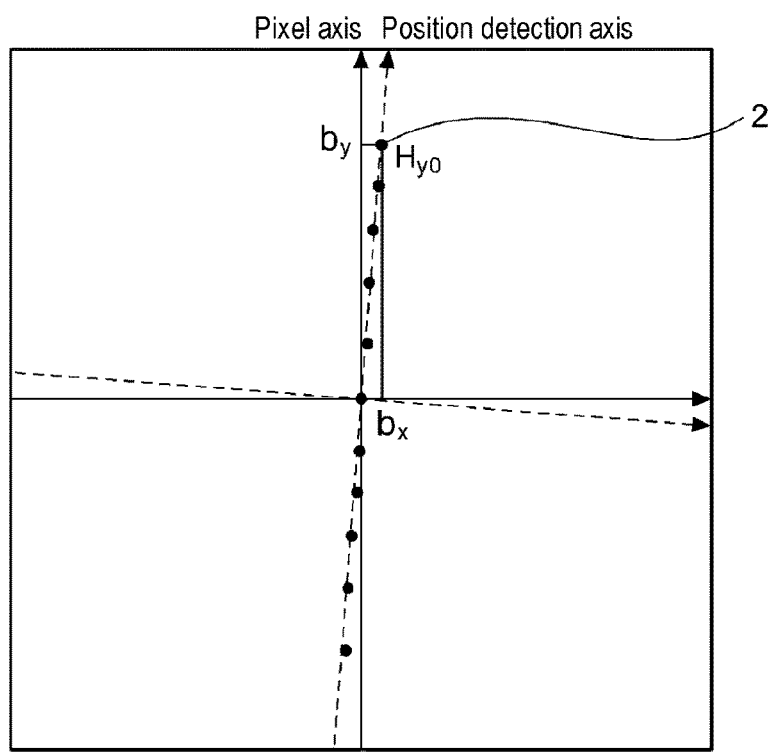
Figure 10A:
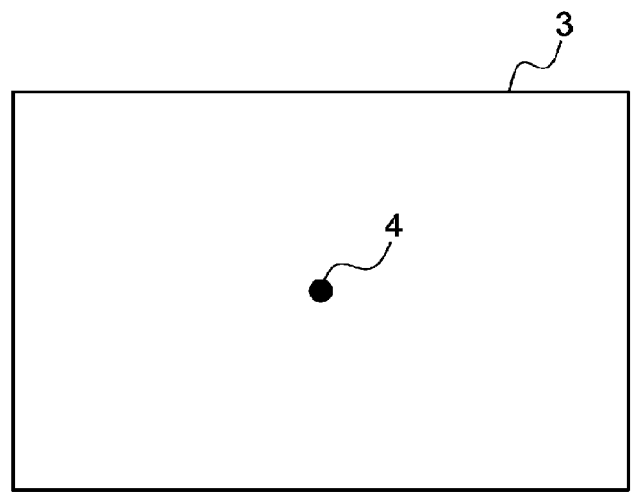
FIG. 10A and FIG. 10B are diagrams illustrating a method of calculating a displacement of an image in the imaging device according to the second embodiment.
Figure 10B:
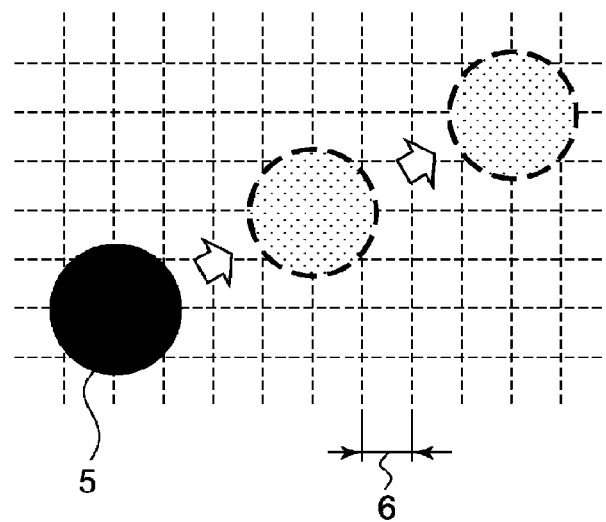

The second embodiment of the present disclosure will be described with reference to FIG. 9A and FIG. 9B and FIG. 10A and FIG. 10B. FIG. 9A and FIG. 9B are diagrams illustrating a deviation (crosstalk) between the pixel axis and the position detection axis in the imaging device according to the second embodiment. FIG. 9A illustrates movement of a pattern on the pixels when driven in a direction in which the position detection signal in the Y direction does not appear, and FIG. 9B illustrates the movement of a pattern on the pixels when driven in a direction in which the position detection signal in the X direction does not appear. FIG. 10A and FIG. 10B are diagrams illustrating a method of calculating a displacement of an image in the imaging device according to the second embodiment. FIG. 10A is a diagram illustrating an example of a subject having a specific pattern and FIG. 10B is a diagram illustrating a state in which a specific pattern image of a subject on the imaging element shifts due to movement of the lens.

A method of measuring a slope of the pixel axis and the position detection axis will be described. A current is applied to the OIS coil in the X direction of the actuator to displace the lens. The Hall elements of X and Y respectively output position detection signals with respect to the displacement of the lens. Here, when the position detection signal of the Hall element in the Y direction changes, a slight current is also applied to the OIS coil in the y direction of the actuator. A drive direction in which the position detection signal of the Hall element in the Y direction hardly changes is found while adjusting the balance of the current application to the OIS coil in the X direction and the current application to the OIS coil in the Y direction. The movement of the specific pattern of the subject at this time is the plot 2 in FIG. 9A. Assuming that their relationship linearly changes, movement amounts of the image in the X direction and the y direction at a certain position detection value $H_{x0}$ are represented by $a_x$ and $a_y$. A ratio of $a_y$ and $a_x$ at this time represents the slope of the pixel axis and the position detection axis, and if the proportional constant is $C_x$, the following equation is obtained.

$$a_y = C_x \cdot a_x \quad \text{Eq. (15)}$$

Similarly, as illustrated in FIG. 9B, a drive direction in which the position detection signal of the Hall element in the X direction hardly changes is found, and movement amounts of the image in the X direction and the Y direction at a certain position detection value $H_{y0}$ are represented by $b_x$ and $b_y$. A ratio of $b_x$ and $b_y$ at this time denotes the slope of the pixel axis and the position detection axis, and if the proportional constant is $C_y$, the following equation is obtained.

$$b_x = C_y \cdot b_y \quad \text{Eq. (16)}$$

Same as in the first embodiment, $C_x$ and $C_y$ denote the slopes inclusive of a sign Further, the position detection sensitivities of the Hall elements in the X direction and the Y direction are represented by $S_x$ and $S_y$, and the respective ratios are represented by $\alpha'$ and $\beta'$ as follows.

$$\alpha' = S_y/S_x \quad \text{Eq. (17)}$$

$$\beta' = S_x/S_y \quad \text{Eq. (18)}$$

From the above, if crosstalk-corrected position detection signals of the Hall elements with respect to the displacements X and Y on the position detection axis are respectively represented by $H_x'$ and $H_y'$, the following equations are obtained.

$$H_x' = H_x'' - S_x \cdot C_y \cdot Y = H_x'' - \beta' \cdot C_y \cdot H_y'' \quad \text{Eq. (19)}$$

$$H_y' = H_y'' - S_y \cdot C_x \cdot X = H_y'' - \alpha' \cdot C_x \cdot H_x'' \quad \text{Eq. (20)}$$

The proportional constants $C_x$ and $C_y$ are actually measured and the ratios $\alpha'$ and $\beta'$ of the position detection sensitivities of the Hall elements on the respective axes are calculated to obtain the crosstalk-corrected position detection signals $H_x'$ and $H_y'$. Thus, it is possible to realize the crosstalk correction by outputting the linear-compensated position detection signals $H_x''$ and $H_y''$.

In order to obtain the result of FIG. 9A, there has been described a method of finding a drive direction in which the position detection signal of the Hall element in the Y direction hardly changes while adjusting the balance of the current application to the OIS coil in the X direction and the current application to the OIS coil in the Y direction, but the present disclosure is not limited thereto. For example, when an offset is given to the Hall signal in the X direction while servo is applied by feeding back the Hall detection signal, the lens is displaced in the direction of the Hall detection axis in the X direction. No offset is given to the Hall signal in the Y direction. The result of FIG. 9A can be obtained by observing the movement of the pattern on the pixels at this time. The result of FIG. 9B can also be obtained by the same method. By giving an offset to the Hall signal while performing the closed-loop control to displace the lens in this way, it is unnecessary to perform a search for finding a drive direction in which crosstalk does not occur as described above. Thus, it is possible to easily measure the slope between the Hall detection axis and the pixel axis.

Here, the displacement of the specific pattern on the pixels when the lens is shifted will be supplementarily described with reference to FIG. 10A and FIG. 10B. In order to measure the image displacement, for example, a dot pattern 4 as illustrated in FIG. 10A may be used as a specific pattern of a subject 3. The dot pattern is not limited to the one in FIG. 10A and may be a white dot on a black background. A plurality of dots may also be used, or a pattern such as a cross line may be used instead of the dot. When such a dot pattern is used as the subject and the lens is shifted, an image 5 of the dot pattern moves on the pixels as illustrated in FIG. 10B. The broken line in FIG. 10B indicates a pixel pitch 6. The image 5 of the dot pattern may span a plurality of pixels. For example, if it is detected how many pixels the center of the dot has shifted, the image movement amount on the pixels (image displacement) may be calculated by multiplying the detected number of pixels by the pixel pitch. Instead of the center of the dot pattern, an edge shift may be detected. By performing such measurement at a plurality of points within a movable range of the lens, it is possible to obtain a trajectory of the displacement of the dot pattern on the pixels. By deriving a slope of this trajectory of the displacement with respect to a pixel matrix, the values of $C_x$ and $C_y$ in the present embodiment may be obtained.

Meanwhile, even at the time of deriving the position detection sensitivity of the Hall element, it is necessary to know the displacement of the lens. Since the position detection sensitivity may also be measured in the manufacturing process of the actuator or the like, the displacement may be measured using a displacement measurer (for example, a laser Doppler measurer or the like) in a direction perpendicular to the dedicated optical axis but the displacement of pixels may be used and converted. The displacement amount on the pixels and the displacement amount of the lens are different but are in a proportional relationship, and when the ratio of the position detection sensitivities is required as in the present embodiment, the displacement of the lens may be substituted by the displacement on the pixels. If this method is used, an expensive displacement measurer becomes unnecessary.

In the present embodiment, the correction of the crosstalk due to the slope of the Hall detection axis and the pixel axis has been described. Initially, even when the pixel axis causes a rotational deviation, if the drive axis of the actuator, the Hall detection axis, and the gyro detection axis are not deviated, the captured image is rotated only slightly from an angle the user wants, having little effect on camera shake correction. The deviation between the Hall detection axis and the gyro axis, rather than the deviation between the Hall detection axis and the pixel axis, should be noted. In the present embodiment, the crosstalk is corrected with respect to the pixel axis. This is because, in many cases where the imaging element and the gyro sensor are mounted on the same substrate with high precision, the gyro axis may be substituted by the pixel axis. That is, the substantial purpose is to correct the crosstalk due to the slope of the gyro axis and the Hall axis.

In the case of a configuration in which the imaging element and the gyro sensor are not on the same substrate, the crosstalk due to the slope of the Hall detection axis and the gyro axis may be corrected by another method in some embodiments, but even in that case, the pixel axis may be used as a medium. That is, the Hall detection axis is corrected such that crosstalk does not occur with the pixel axis as a reference, and the crosstalk is corrected such that the gyro detection axis matches the pixel axis. The gyro sensor may be adjusted in rotation so as to match the pixel axis of the camera module, but it is easier to correct crosstalk by matching the gyro detection signal with the direction of the pixel axis. Specifically, the slope of the pixel axis and the gyro axis is detected, and each gyro detection signal is vector-distributed in the direction of the pixel axis according to the slope angle. Even on the camera module side, if the crosstalk due to the slope of the pixel axis and the Hall detection axis is corrected, the crosstalk due to the slope of the gyro detection axis and the Hall detection axis is also corrected accordingly. The method of crosstalk correction between the gyro detection axis and the pixel axis is not limited. The direction of the detection axis of the gyro sensor may be measured by vibrating a mobile phone or the like on which the camera module and the gyro sensor are mounted, or other methods may be used.

Third Embodiment

Figure 11:
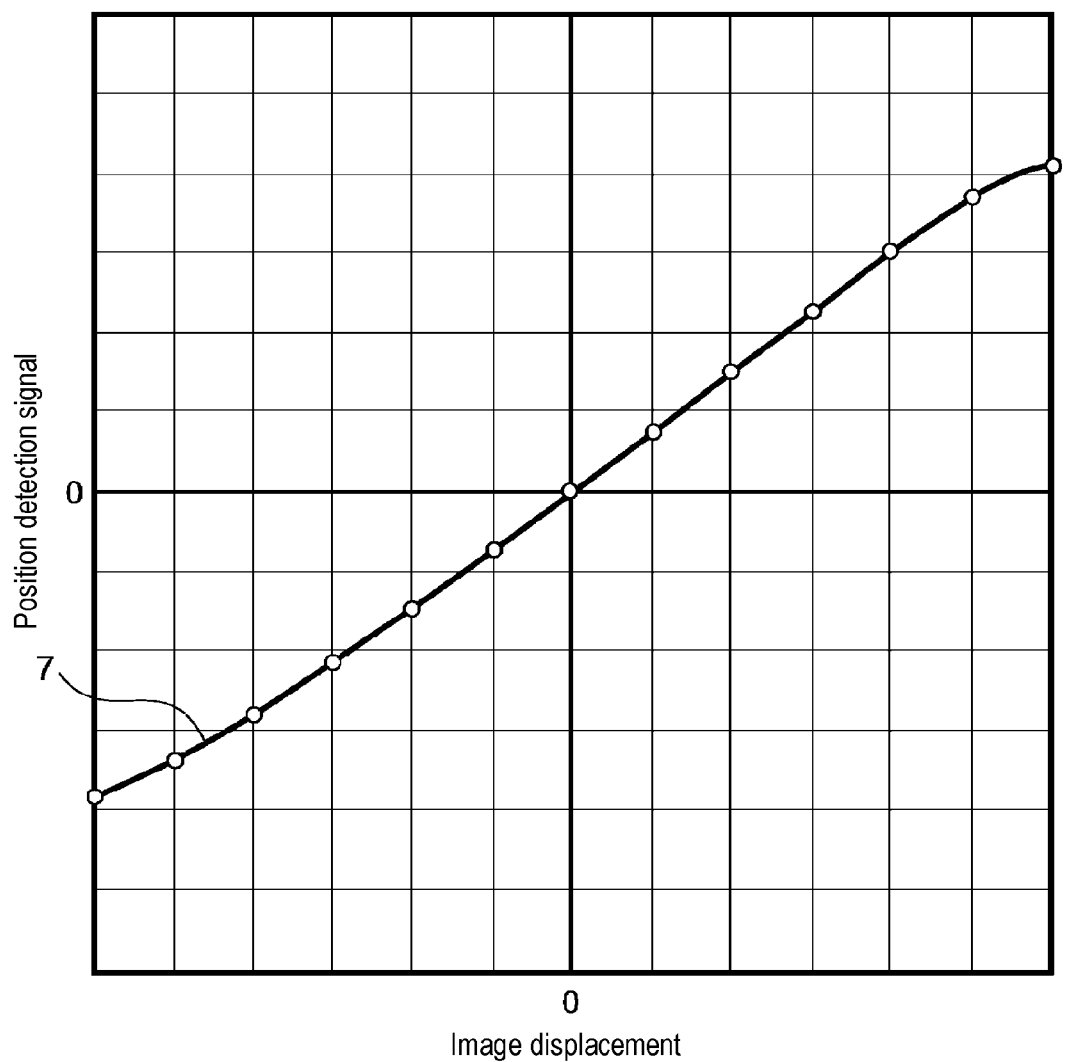
FIG. 11 is a diagram illustrating an example of a relationship between a position detection signal and an image displacement in an imaging device according to a third embodiment of the present disclosure.
Figure 12:
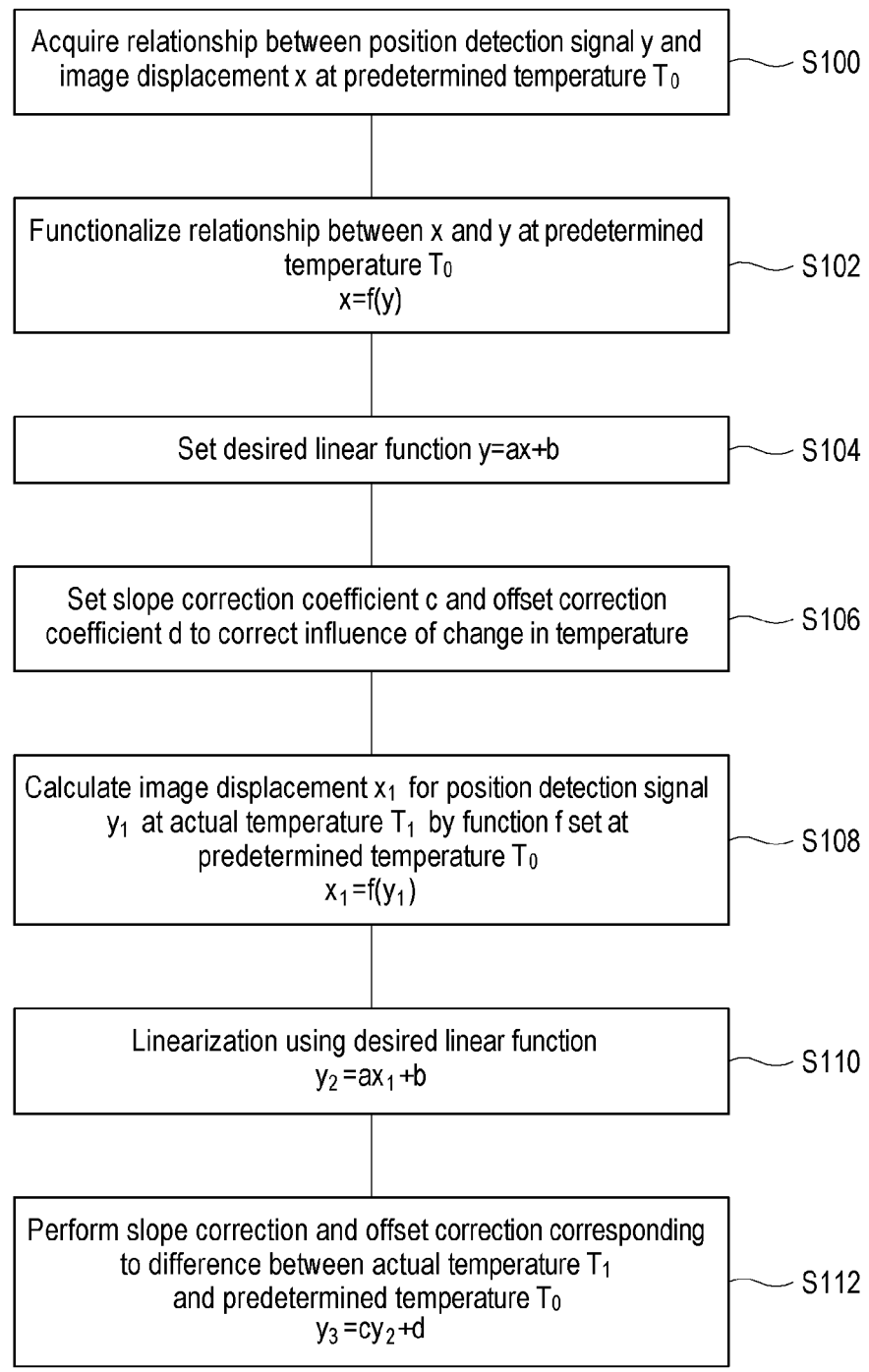
FIG. 12 is a flowchart illustrating processing of linear compensation and temperature compensation in the imaging device according to the third embodiment.
Figure 13:
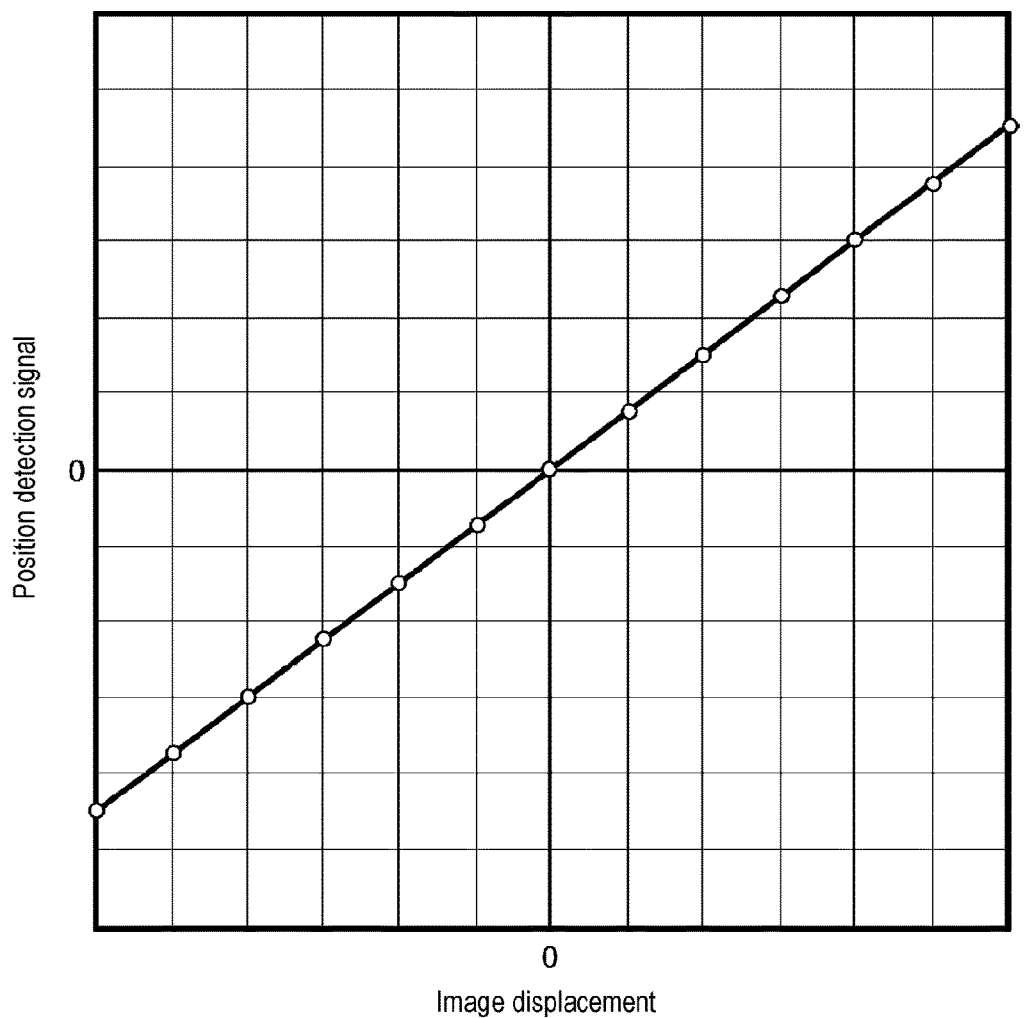
FIG. 13 is a diagram illustrating a result after linear correction to the result of FIG. 11.
Figure 14:
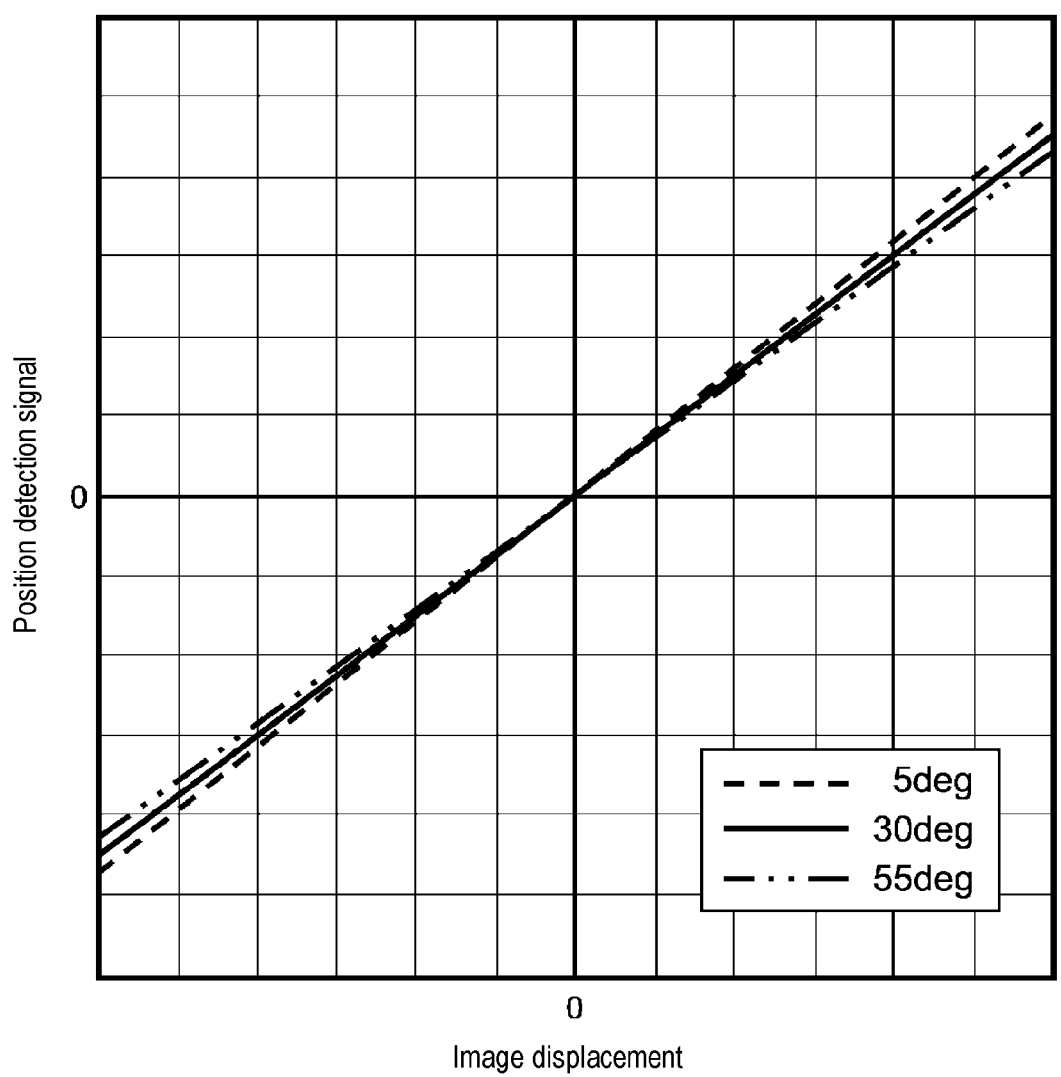
FIG. 14 is a diagram illustrating a result when a relationship between a position detection signal and an image displacement after the linear correction varies with temperature.
Figure 15:
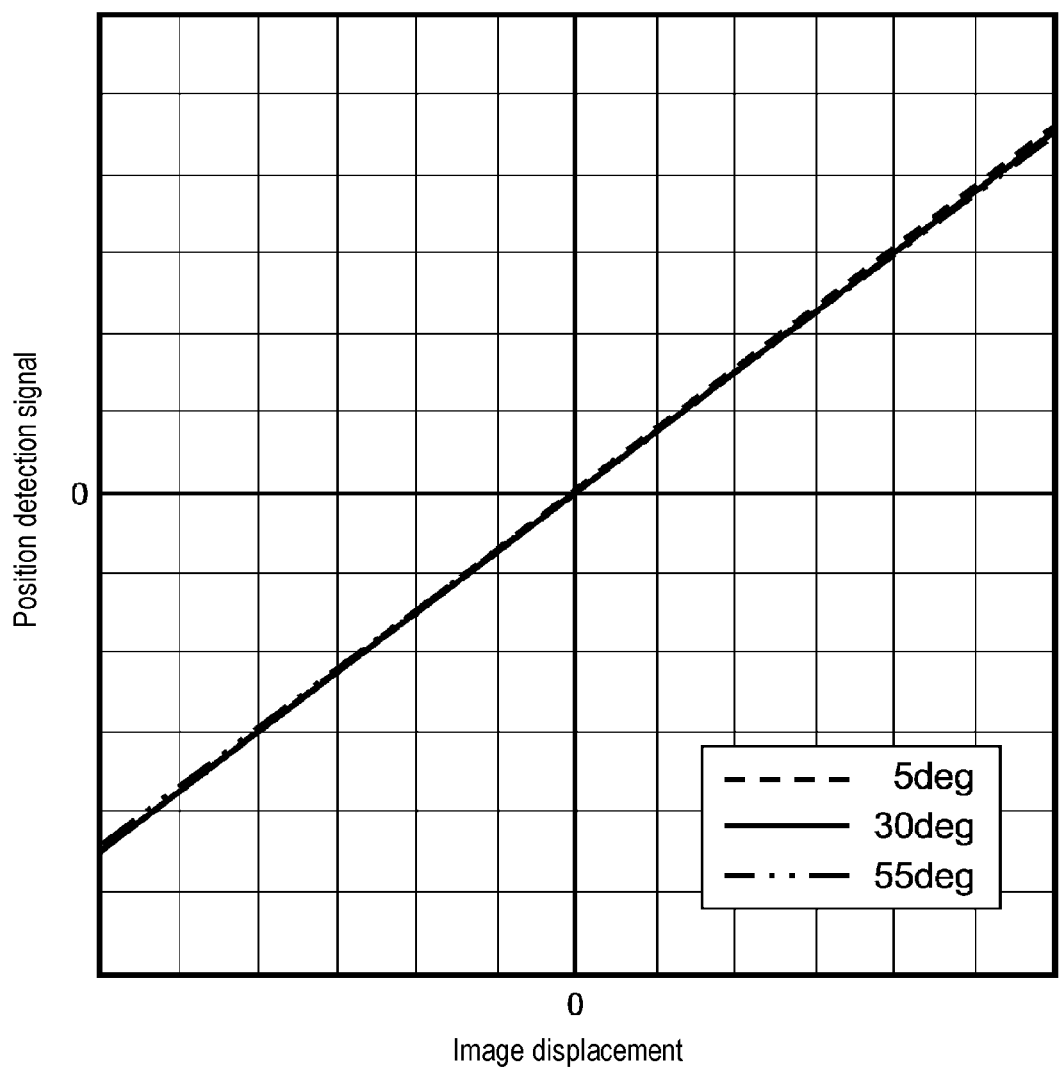
FIG. 15 is a diagram illustrating a result after performing temperature compensation on the result of FIG. 14.

A third embodiment of the present disclosure will be described with reference to FIG. 11 to FIG. 15. FIG. 11 is a diagram illustrating an example of a relationship between a position detection signal and an image displacement in an imaging device according to the third embodiment. FIG. 12 is a flowchart illustrating a processing of linear compensation and temperature compensation in the imaging device according to the third embodiment. FIG. 13 is a diagram illustrating a result after performing linear correction on the result of FIG. 11. FIG. 14 is a diagram illustrating a result when a relationship between a position detection signal and an image displacement after linear correction varies with temperature. FIG. 15 is a diagram illustrating a result after performing temperature compensation on the result of FIG. 14.

In the third embodiment, the linear compensation and temperature compensation will be described. First, when a linearity between the displacement and the position detection signal deviates, there is a possibility that a linearity of crosstalk in other direction with respect to the displacement in a certain direction will also deviate. Then, inconsistencies may arise also on the linear assumption such as Eqs. (1), (11), (15), (16) or the like indicating the ratio of crosstalk, and the precision of crosstalk correction may be deteriorated. In some embodiments, the linear compensation may be performed before crosstalk correction, if possible. Further, changing the slope of linearity depending on the temperature may cause a deterioration in the precision of crosstalk correction, and thus, a temperature compensation may be performed as well, in some embodiments.

An example of a relationship between an image displacement and a position detection signal when displacement of an image is used as displacement information, i.e., the result of x-y characteristics, is illustrated in FIG. 11. A solid line 7 is a smooth curve connecting results of multiple measurement points. Since the actuator for OIS usually has a movable range on both sides of a spring in a neutral state, the neutral state of the spring is set to an image displacement of 0 in the graph. Further, the position detection signal at this position is set to 0. As can be seen from the drawing, the linearity is relatively good in a region where the image displacement, i.e., a shift amount of the lens, is small, but the linearity slightly becomes deteriorated as the image displacement, i.e., the shift amount of the lens, becomes large.

An overall processing of linear compensation and temperature compensation will be described with reference to FIG. 12. The relationship between the position detection signal and the image displacement is functionalized by a curve and then corrected into a straight line. Although the linearization may be performed by using the result of functionalization as it is, if the function is proximated by connecting a plurality of straight lines, an amount of calculation can be reduced. At the time of functionalization, it may be obtained by solving an equation as a function through a plurality of measurement points, but a function that minimizes an average error for many measurement points may be derived. By doing so, even when an unusual point (for example, when it contains noise, or the like) is selected as a measurement point, an influence of the unusual point can be minimized.

Steps S100 to S104 will be described as being performed in an inspection process (referred to as a calibration process) before shipment after manufacture of the imaging device 300, but the present disclosure is not limited thereto. As will be described hereinbelow, if this process is performed while the user is using the camera, a function at a temperature in use can be derived, and thus, the temperature compensation after linearization becomes unnecessary. Step S106 is set from experimental data in a development stage, or the like. As described above, when the functionalization is performed while the user is using the camera, the coefficient setting for temperature compensation also becomes unnecessary. At step S100, a relationship (x–y characteristics) between the position detection signal y (position detection value $P_{FB}$ in FIG. 4) and the displacement x is acquired at a predetermined temperature (also referred to as a reference temperature) $T_0$, for example, at a set temperature in a manufacturing factory or the like. In the present embodiment, the displacement x is a displacement of a specific pattern on the imaging element when the lens is displaced. The position detection signal y may be an output voltage of the Hall element. In the case of servo-on measurement, it may be a target code (position command value $P_{REF}$ in FIG. 4). This is because the target code is a code indicating a target access position and, if the servo is applied and converged to the target position, it becomes equivalent to the output voltage of the Hall element. It cannot be said that the relationship between the position detection signal y and the displacement x measured in this way is maintained linear, and it is considered that the relationship will also change as the temperature changes from $T_0$. Step S100 is performed for all entities.

At step S102, the relationship between the acquired position detection signal y and the image displacement x is functionalized. Here, it is functionalized by taking an inverse function, like x=f(y). The function fits a nonlinear relationship, and thus, a second or higher order function is necessary (polynomial approximation). Increasing the order decreases a fitting error, but since the amount of calculation increases, it may be sufficient to set the order according to an actual situation. For the following linear compensation, a fifth order function is used.

$$x=f(y)=k_0+k_1y+k_2y^2+k_3y^3+k_4y^4+k_5y^5 \quad \text{Eq. (21)}$$

In the case of performing linear compensation in an actual imaging device, since it takes a long computation time to operate such a fifth order function and memory capacity needed during the computation also increases, the function may be interpolated by connecting straight lines as described above.

At step S104, a linear function $y=a_x+b$ is set. A slope a and an intercept b of the linear function $y=a_x+b$ may be defined in consideration of the x-y characteristics obtained at step S100 in some embodiments. For example, the slope a and intercept b may be derived by linearly approximating the x-y characteristics. Furthermore, the linear function $y=a_x+b$ may be determined irrespective of the x-y characteristics at the reference temperature $T_0$.

When zero point adjustment is performed at the time of measurement, since the linear function y passes through the origin from the measurement stage, i.e., since b=0, it is sufficient to derive only the slope a. On the other hand, when the measurement result does not pass through the origin, it may be shifted so as to pass through the origin by performing an offset correction (b≠0) or $y=a_x+b$ may be defined as a straight line connecting two arbitrary points of the measurement result.

At step S106, in order to correct an influence of a difference between the actual temperature $T_1$ and the predetermined temperature $T_0$, a slope correction coefficient c and an offset correction coefficient d are set. It is best to set these coefficients for various temperatures $T_1$ for each entity in terms of compensation accuracy, but measuring even the temperature characteristics for each product increases a process cost, which is not practical. Therefore, in some embodiments, the temperature characteristics of a plurality of representative samples may be measured to set optimum correction coefficients c and d in the laboratory or offline process. It is recognized that the correction coefficients change as the temperature changes with respect to the reference temperature. Since the x-y characteristics at the reference temperature are measured for each entity, an optimum correction coefficient at each temperature is set on the assumption of a change with respect to the correction coefficients at this time. The actual temperature $T_1$ may be discrete. If the actual temperature measured by a temperature measuring means as described hereinbelow is in the middle of the temperature at which the correction coefficients are set in advance, the correction coefficients may be set by interpolation calculation.

Steps S108 to S112 are steps during the actual operation of the actuator driver IC 500. A value of the position detection signal y obtained from the position detection element 404 during the actual operation is represented by $y_1$.

At step S108, a displacement $x_1$ for the position detection signal $y_1$ is obtained using a function f. The function f is a function set for the x-y characteristics at the predetermined temperature $T_0$, but the same function is also used at different temperatures. As described above, when the function set at the temperature is used at each temperature, the accuracy of correction can be improved. However, in order to set the function of each temperature, it is necessary to measure the temperature characteristics of each temperature for each sample. Therefore, it is not practical, and the function at the predetermined temperature $T_0$ is used for all temperatures as in this example.

At step S110, the displacement $x_1$ obtained in this way is applied to the initially set linear function to calculate a value $y_2$ of the linear-compensated position detection signal.

The result of the x-y characteristics after the linear compensation is illustrated in FIG. 13. However, this is the result when $T_1=T_0$. Next, the result of the temperature characteristics is illustrated in FIG. 14. Since the predetermined temperature $T_0$ is set at 30 degrees C. and a function at this temperature is used, a change in the slope is observed even though it is slight at the other temperature $T_1$.

At step S112, the slope correction and the offset correction are performed on the result at the temperature $T_1$ different from $T_0$ so that the result at $T_1$ becomes the same as the result at $T_0$. That is, a value $y_3$ of the position detection signal after temperature compensation is calculated for the value $y_2$ of the position detection signal after linearization.

The result of x-y characteristics after the temperature compensation is illustrated in FIG. 15. The results at different temperatures are also corrected to be substantially the same straight lines. Since the straight line in FIG. 14 passes substantially the origin, offset correction is not performed and only the slope is corrected.

In this manner, by performing the linear compensation and the temperature compensation, it is possible to obtain substantially the linear x-y characteristics that are not affected by temperature, and expensive displacement measurer or time-consuming measurements also become unnecessary by using the displacement information of the image in order to obtain information on the actual displacement of the lens at the time of linear compensation.

The flow of FIG. 12 illustrates an example, and does not define even the processing order. For example, the temperature compensation for a displacement component may be first performed, and the linear compensation may be performed on the result after the temperature compensation.

<Regarding Lens Control Device>

Next, a specific configuration example of the lens control device 400 will be described.

Figure 16:
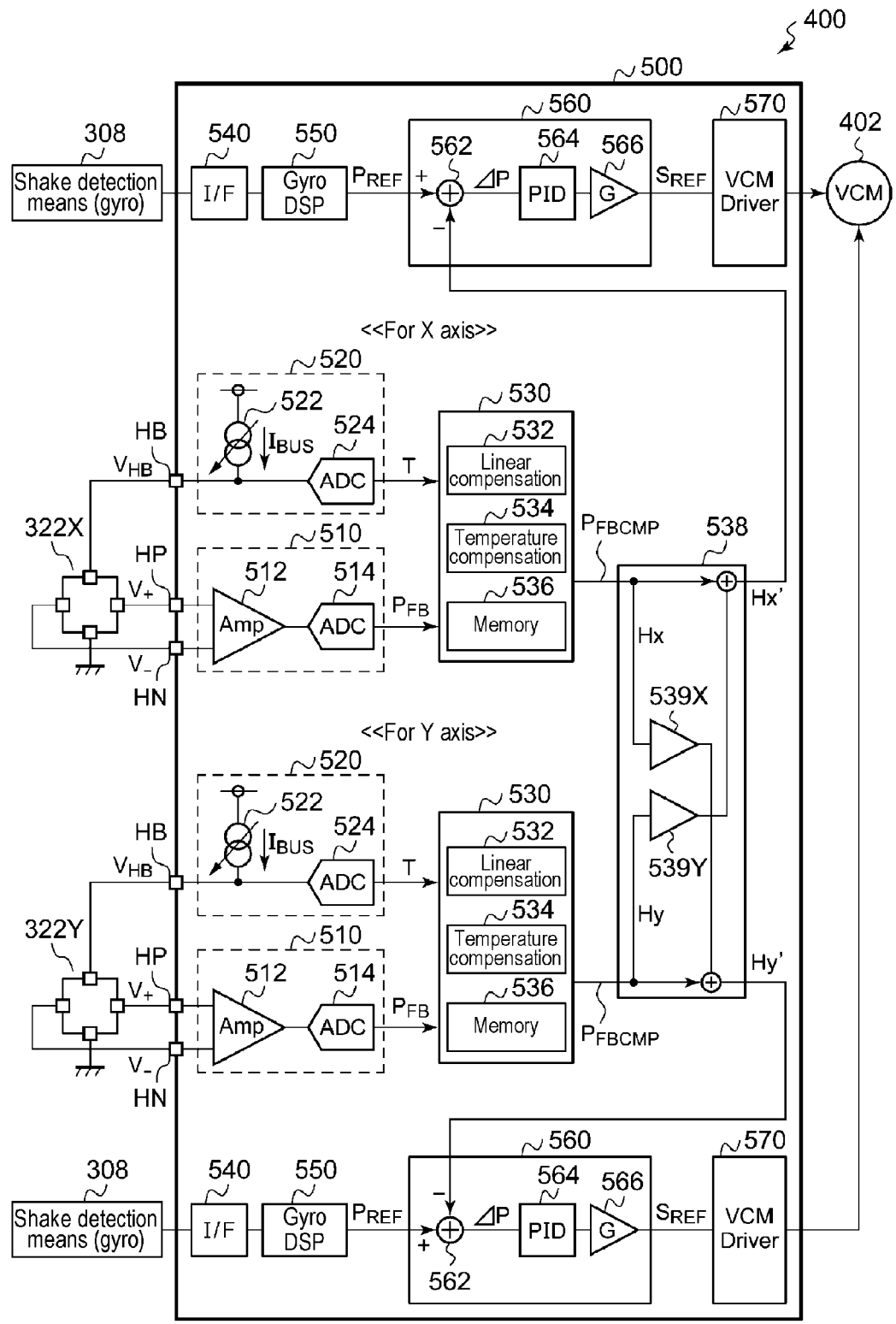
FIG. 16 is a specific block diagram of a lens control device.

FIG. 16 is a specific block diagram of the lens control device 400. In FIG. 16, circuit blocks for the X axis and the Y axis are illustrated, and those for auto focus are omitted. Since the X axis and the Y axis are configured in the same manner, unless otherwise necessary, they will be described in common without distinguishing them.

The position detection element 404 is Hall elements 322X and 322Y, generates Hall voltages V+ and V− according to a displacement of a movable part of the actuator 402, and supplies the same to Hall detection pins HP and HN of the actuator driver IC 500.

The position detection part 510 generates a digital position detection value $P_{FB}$ indicating a position (displacement) of the movable part of the actuator 402 based on the Hall voltages V+ and V−. The position detection part 510 includes a Hall amplifier 512 for amplifying the Hall voltage and an A/D converter 514 for converting the output of the Hall amplifier 512 into a position detection value $P_{FB}$ having a digital value.

The temperature detection part 520 generates a temperature detection value T indicating a temperature. As described above, the temperature may indicate a temperature of the position detection element 404 in some embodiments. In FIG. 16, the Hall elements 322X and 322Y (hereinafter, generically referred to as 322) which are the position detection element 404 are also used as the temperature detection element 406. This is based on the fact that an internal resistance r of the Hall element 322 has temperature dependence. The temperature detection part 520 measures the internal resistance r of the Hall element 322 and uses it as information indicating the temperature.

The temperature detection part 520 includes a constant current circuit 522 and an A/D converter 524. The constant current circuit 522 supplies a predetermined bias current $I_{BIAS}$ to the Hall element 322. The bias current $I_{BIAS}$ is also a power source signal necessary to operate the Hall element 322, and thus, the constant current circuit 522 may be recognized as a Hall bias circuit.

A voltage drop ($I_{BIAS} \times r$) occurs between both ends of the Hall element 322. This voltage drop is input to a Hall bias pin HB. The A/D converter 524 converts a voltage $V_{HB}$ (=$I_{BIAS} \times r$) of the HB pin into a digital value T. Since the bias current $I_{BIAS}$ is already known and constant, the digital value T is a signal that is proportional to the internal resistance r, and therefore, contains information on the temperature of the Hall element 32. A relationship between the internal resistance r and the temperature is measured in advance, is functionalized or tabled, and the digital value T is converted into temperature information in a correction part 530 of a subsequent stage.

An interface circuit 540 receives a pitch angular velocity $\omega_P$ and a yaw angular velocity $\omega_Y$ from the gyro sensor which is the shake detection means 308. For example, the interface circuit 540 may be a serial interface such as an inter IC (I²C). A gyro DSP 550 integrates the angular velocity signals $\omega_P$ and $\omega_Y$ received by the interface circuit 540 to generate a position command value $P_{REF}$.

The correction part 530 corrects the position detection value $P_{FB}$ from the position detection part 510. Specifically, the correction part 530 includes a linear compensation part 532, a temperature compensation part 534, and a memory 536. The linear compensation part 532 corrects the linearity of the relationship between the position detection value $P_{FB}$ and the actual displacement (the aforementioned x-y characteristics). The parameters a and b, the data (for example, coefficients $k_0$ to $k_5$) describing the function x=f(y), the parameters c and d, and the like as described above are stored in the memory 536. The memory 536 may be a nonvolatile memory such as an ROM or a flash memory, or may be a volatile memory that temporarily stores data supplied from an external ROM every time the circuit is activated.

The temperature compensation part 534 corrects the change in relationship due to the change in temperature with respect to the relationship between the position detection value $P_{FB}$ and the actual displacement.

The crosstalk compensation part 538 is represented by two multipliers 539X and 539Y. Each amplifier 539 performs the crosstalk compensation by multiplying one Hall detection signal by a predetermined coefficient inclusive of a sign and adding the same to the other Hall detection signal. The processing here may be expressed as Eqs. (13), (14), (19) and (20).

A controller 560 receives the position command value $P_{REF}$ and the crosstalk-corrected position detection values $H_x'$ and $H_y'$. The controller 560 generates a control command value $S_{REF}$ such that the position detection values $H_x'$ and $H_y'$ match the position command value $P_{REF}$. When the actuator 402 is a voice coil motor, the control command value $S_{REF}$ is a command value of a drive current to be supplied to the voice coil motor. The controller 560 includes, for example, an error detector 562 and a PID controller 564. The error detector 562 generates a difference (error) AP between the position detection values $H_x$ and $H_y'$ and the position command value $P_{REF}$. The PID controller 564 generates a control command value $S_{REF}$ by a proportional-integral-derivative (PID) operation. Instead of the PID controller 564, a PI controller may be used, or a nonlinear control may be adopted. A gain circuit 566 for multiplying a predetermined coefficient may be installed in a subsequent stage of the PID controller 564. A driver part 570 supplies a drive current corresponding to the control command value $S_{REF}$ to the actuator 402.

As can be seen from FIG. 16, the Hall voltages V+ and V− from the Hall element 32 are output from a terminal different from the terminals to which the control current is applied.

The processing of the correction part 530 and the controller 560 may be realized by a hardware such as an adder or a multiplier or may be realized by a combination of a CPU and a software program.

The lens control device as described above is used for a camera module for mobile phone, and the like. In particular, one suitable application of the lens control device is an imaging device having an optical image stabilization (OIS) function. Using the present disclosure, it is possible to detect a position of an object with high precision without crosstalk and to realize high-precision camera shake correction. In addition, since the crosstalk compensation and linear compensation can be performed without using an expensive measurer, the lens control device according to the present disclosure may be applied to an imaging device having an OIS function.

The following technique is disclosed in the present specification.

One disclosure relates to an imaging device. The imaging device includes an imaging lens, an imaging element, an actuator that drives the imaging lens in an XY plane perpendicular to an optical axis, and position detection means that detects positions of the imaging lens in the X and Y directions, and when a crosstalk occurs in which the position detection means in the Y direction or the X direction may detect respective displacements while driving the imaging lens in the X direction or the Y direction, the imaging device includes a crosstalk compensation means that corrects a position detection signal by the position detection means so as to reduce crosstalk of position detection.

With the aforementioned configuration, even when crosstalk exists in which the position detecting means in the Y direction or the X direction may detect respective displacements while driving the imaging lens in the X direction or the Y direction, the crosstalk of position detection with respect to a drive direction of the lens or a moving direction of pixels is corrected, thereby realizing high-precision camera shake correction.

Furthermore, in the imaging device according to an embodiment of the present disclosure, when a ratio of a position detection signal of a position detection means for a Y axis to a position detection signal of a position detection means for an X axis while driving the imaging lens in the X direction is set to α and a ratio of the position detection signal of the position detection means for the X axis to the position detection signal of the position detection means for the Y axis while driving the imaging lens in the Y direction is set to β, the crosstalk of the position detection signals may be corrected by using the values of α and β.

With the aforementioned configuration, since the crosstalk of position detection can be corrected regardless of a difference between sensitivity of the position detection means for the X axis and sensitivity of the position detection means for the Y axis, data acquisition necessary for correction can minimized, and the crosstalk compensation is easy.

Furthermore, in the imaging device according to an embodiment of the present disclosure, displacement information of the imaging lens used for the crosstalk compensation may be calculated as a moving distance of an image when the imaging lens is moved from image information of the imaging element.

With the aforementioned configuration, it is possible to obtain the displacement information of the imaging lens without using an expensive displacement measurer, and to correct crosstalk of position detection with respect to the drive direction based on the obtained displacement information.

In the imaging device according to an embodiment of the present disclosure, the moving distance of the image may be calculated based on the number of pixels to which the image has moved and the pixel pitch of the imaging element.

With the aforementioned configuration, it is possible to calculate the displacement of the imaging lens by simple calculation.

The imaging device according to an embodiment of the present disclosure may include a linear compensation means that corrects linearity of a relationship between the displacement of the imaging lens and the position detection signal by the position detection means.

According to the aforementioned configuration, since the linearity of the relationship between the position detection signal before crosstalk compensation and the displacement of the imaging lens can be corrected, an accuracy of crosstalk compensation can be improved.

The imaging device according to an embodiment of the present disclosure may include a temperature compensation means that corrects a change of the relationship due to a temperature, in addition to the linear compensation means.

With the aforementioned configuration, since the temperature compensation can be performed in addition to the linear compensation, the accuracy of crosstalk compensation can be further enhanced.

The imaging device according to an embodiment of the present disclosure may perform the temperature detection of the temperature compensation means by using a change of an internal resistance of the position detection means due to the temperature.

With the aforementioned configuration, since the temperature is detected using a change in inter-terminal resistance of the position detection means, it is possible to accurately recognize an ambient temperature of an object to be temperature-compensated, and to realize the temperature compensation with high precision.

Another embodiment of the present disclosure relates to an actuator driver. The actuator driver includes position detection parts that generates position detection values indicating positions of a control target in two directions in a plane respectively, a crosstalk compensation part that corrects crosstalk of the position detection values detected by the position detection parts, a controller that generates a control command value such that the corrected position detection value and a position command value indicating a target position of the control target coincide with each other, and a driver part that applies a drive signal corresponding to the control command value to the actuator, wherein the crosstalk compensation part includes a processing part that performs a predetermined operation process on the position detection signal in one direction and then adding the same to or subtracting the same from the position detection signal in the other direction.

According to the embodiment, even when a crosstalk occurs in which the position detection means in another direction different from the drive direction may detect displacement while driving the imaging lens in each direction in two directions in the plane, the crosstalk of position detection with respect to the drive direction or the moving direction of the pixels is corrected, thereby realizing high-precision camera shake correction.

In the actuator driver according to an embodiment of the present disclosure, when a ratio of the position detection value of the position detection part in the second direction to the position detection value of the position detection part in the direction while driving the control target in the first direction is set to $\alpha$ and a ratio of the position detection value of the position detection part in the first direction to the position detection value of the position detection part in that direction while driving the control target in the second direction is set to $\beta$, the crosstalk of the position detection values may be corrected by using the values of $\alpha$ and $\beta$.

In the actuator driver according to an embodiment of the present disclosure, the crosstalk compensation part may correct the crosstalk of the position detection values using the displacement information obtained from the movement information of the image in the image information of the imaging element.

The actuator driver according to an embodiment of the present disclosure may include a linear compensation part that corrects a linearity of a relationship between a displacement of the control target and the position detection values.

The actuator driver according to an embodiment of the present disclosure may have a temperature compensation part that corrects a change of the relationship due to a temperature.

According to the present disclosure in some embodiments, it is possible to detect a position of an object with high precision by reducing the effect of crosstalk.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:
1. An imaging device, comprising:
   an imaging lens supported so as to be displaceable in a first direction and a second direction in a plane perpendicular to an optical axis;
   an actuator configured to position the imaging lens in the first direction and the second direction;
   a position detector configured to generate a first position detection signal $H_x$ indicating a position of the imaging lens in the first direction and to generate a second position detection signal $H_y$ indicating a position of the imaging lens in the second direction, the first position detection signal $H_x$ including a crosstalk component caused by displacing the imaging lens in the second direction, and the second position detection signal $H_y$ including a crosstalk component caused by displacing the imaging lens in the first direction;
   a crosstalk compensator configured to correct the first position detection signal $H_x$ and the second position detection signal $H_y$ such that the crosstalk components respectively included in the first position detection signal $H_x$ and the second position detection signal $H_y$ are reduced; and a driver configured to control the actuator based on a crosstalk-corrected first position detection signal $H_x{'}$ and a crosstalk-corrected second position detection signal $H_y{'}$, wherein when a ratio of the second position detection signal $H_y$ to the first position detection signal $H_x$ while driving the imaging lens in the first direction is set to α and a ratio of the first position detection signal $H_x$ to the second position detection signal $H_y$ while driving the imaging lens in the second direction is set to β, the crosstalk compensator is configured to reduce the crosstalk components included in the first position detection signal $H_x$ and the second position detection signal $H_y$ according to the following equations:

$$H_x{'}=H_x-\beta \cdot H_y$$

$$H_y{'}=H_y-\alpha \cdot H_x.$$

2. The imaging device of claim 1, wherein when a detection sensitivity in the first direction and a detection sensitivity in the second direction measured before assembling the actuator in the imaging device are respectively set to $S_x$ and $S_y$, and a detection sensitivity in the first direction and a detection sensitivity in the second direction measured after assembling the actuator in the imaging device are respectively set to $S_x{'}$ and $S_y{'}$, the crosstalk compensator is configured to reduce the crosstalk components included in the first position detection signal $H_x$ and the second position detection signal $H_y$ according to the following equations:

$$H_x{'}=H_x-S_x{'}/S_y{'}\cdot S_y/S_x \cdot \beta H_y$$

$$H_y{'}=H_y-S_y{'}/S_x{'}\cdot S_x/S_y \cdot \alpha H_x.$$

3. The imaging device of claim 1, further comprising an imaging element configured to capture an image that has passed through the imaging lens,
wherein correct displacement information of the imaging lens used in a calibration process is calculated as a moving distance of an image when the imaging lens moves, based on image information of the imaging element.

4. The imaging device of claim 3, wherein the moving distance of the image is calculated based on the number of pixels by which the image has moved and a pixel pitch of the imaging element.

5. The imaging device of claim 1, further comprising a linear compensator configured to correct linearity of a relationship between a displacement of the imaging lens in the first direction and the first position detection signal $H_x$ and to correct linearity of a relationship between a displacement of the imaging lens in the second direction and the second position detection signal $H_y$.

6. The imaging device of claim 5, further comprising a temperature compensator configured to correct temperature dependence of the relationship between the displacement of the imaging lens in the first direction and the first position detection signal $H_x$ and the relationship between the displacement of the imaging lens in the second direction and the second position detection signal $H_y$.

7. The imaging device of claim 6, wherein temperature detection of the temperature compensator is based on temperature characteristics of an internal resistance of the position detector.

8. An imaging device, comprising:
an imaging lens supported so as to be displaceable in a first direction and a second direction in a plane perpendicular to an optical axis;
an actuator configured to position the imaging lens in the first direction and the second direction;
a position detector configured to generate a first position detection signal $H_x$ indicating a position of the imaging lens in the first direction and to generate a second position detection signal $H_y$ indicating a position of the imaging lens in the second direction, the first position detection signal $H_x$ including a crosstalk component caused by displacing the imaging lens in the second direction, and the second position detection signal $H_y$ including a crosstalk component caused by displacing the imaging lens in the first direction;
a crosstalk compensator configured to correct the first position detection signal $H_x$ and the second position detection signal $H_y$ such that the crosstalk components respectively included in the first position detection signal $H_x$ and the second position detection signal $H_y$ are reduced; and
a driver configured to control the actuator based on a crosstalk-corrected first position detection signal $H_x{'}$ and a crosstalk-corrected second position detection signal $H_y{'}$,
wherein when a displacement X indicated by the first position detection signal $H_x$ and a displacement Y indicated by the second position detection signal $H_y$ are plotted while driving and displacing the imaging lens in the first direction, the following equation is established, $$Y=C_x \cdot X,$$

when a displacement X indicated by the first position detection signal $H_x$ and a displacement Y indicated by the second position detection signal $H_y$ are plotted while driving and displacing the imaging lens in the second direction, the following equation is established, $$X=C_y \cdot Y, \text{ and}$$

when a detection sensitivity in the first direction is set to $S_x{'}$ and a detection sensitivity in the second direction is set to $S_y{'}$, measured after assembling the actuator in the imaging device, the crosstalk compensator is configured to reduce the crosstalk components included in the first position detection signal $H_x$ and the second position detection signal $H_y$ according to the following equations:

$$H_x-S_x{'}/S_y{'}\cdot C_y \cdot H_y$$

$$H_y-S_y{'}/S_x{'}\cdot C_x \cdot H_x.$$

9. An imaging device, comprising:
an imaging lens supported so as to be displaceable in a first direction and a second direction in a plane perpendicular to an optical axis;
an imaging element configured to capture an image that has passed through the imaging lens;
an actuator configured to position the imaging lens in the first direction and the second direction;
a position detector configured to generate a first position detection signal $H_x$ indicating a position of the imaging lens in the first direction and to generate a second position detection signal $H_y$ indicating a position of the imaging lens in the second direction;
a crosstalk compensator configured to correct the first position detection signal $H_x$ and the second position detection signal $H_y$ such that crosstalk components respectively included in the first position detection signal $H_x$ and the second position detection signal $H_y$ are reduced; and a driver configured to control the actuator based on a crosstalk-corrected first position detection signal $H_x'$ and a crosstalk-corrected second position detection signal $H_y'$, wherein the first position detection signal $H_x$ includes a crosstalk component caused by displacing the imaging lens in the second direction and the second position detection signal $H_y$ includes a crosstalk component caused by displacing the imaging lens in the first direction, wherein correct displacement information of the imaging lens is calculated as a moving distance of the image when the imaging lens moves, based on image information of the imaging element, wherein when a movement amount $a_x$ of the image in the first direction and a movement amount $a_y$ of the image in the second direction are plotted by controlling the actuator so as not to cause a change in the second position detection signal, the following equation is established:

$$a_y = C_x' \cdot a_x,$$

wherein when a movement amount $b_x$ of the image in the first direction and a movement amount $b_y$ of the image in the second direction are plotted by controlling the actuator so as not to cause a change in the first position detection signal, the following equation is established:

$$b_x = C_y' \cdot b_y, \text{ and}$$

wherein when detection sensitivities in the first direction and the second direction are respectively set to $S_x$ and $S_y$, the crosstalk compensator is configured to reduce the crosstalk components included in the first position detection signal $H_x$ and the second position detection signal $H_y$ according to the following equations:

$$H_x' = H_x - S_x/S_y \cdot C_y \cdot H_y$$

$$H_y' = H_y - S_y/S_x \cdot C_x \cdot H_x.$$

10. The imaging device of claim 9, wherein the actuator is controlled such that closed-loop control is performed by feeding back the first position detection signal and the second position detection signal, wherein the actuator is controlled so as not to cause a change in the first position detection signal while giving an offset to the first position detection signal in order to move the image in the first direction, and wherein an offset is given to the second position detection signal in order to move the image in the first direction.

11. The imaging device of claim 9, further comprising a linear compensator configured to correct linearity of a relationship between a displacement of the imaging lens in the first direction and the first position detection signal $H_x$ and linearity of a relationship between a displacement of the imaging lens in the second direction and the second position detection signal $H_y$, wherein the crosstalk compensator is configured to correct a linear-compensated first position detection signal $H_x''$ and a linear-compensated second position detection signal $H_y''$ such that crosstalk components included in the linear-compensated first position detection signal $H_x''$ and the linear-compensated second position detection signal $H_y''$ are reduced.

12. The imaging device of claim 11, further comprising a temperature compensator configured to correct temperature dependence of the relationship between the displacement of the imaging lens in the first direction and the first position detection signal $H_x$ and the relationship between the displacement of the imaging lens in the second direction and the second position detection signal $H_y$.

13. The imaging device of claim 12, wherein temperature detection of the temperature compensator is based on temperature characteristics of an internal resistance of the position detector.

* * * * *